United States Patent
Lv et al.

(10) Patent No.: US 12,444,029 B2
(45) Date of Patent: Oct. 14, 2025

(54) METHOD AND DEVICE FOR DEPTH IMAGE COMPLETION

(71) Applicant: SAMSUNG ELECTRONICS CO., LTD., Suwon-si (KR)

(72) Inventors: Zhaohui Lv, Xi'an (CN); Xiaolei Zhang, Xi'an (CN); Mingming Fan, Xi'an (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 345 days.

(21) Appl. No.: 18/103,281

(22) Filed: Jan. 30, 2023

(65) Prior Publication Data

US 2023/0245282 A1    Aug. 3, 2023

(30) Foreign Application Priority Data

Jan. 29, 2022  (CN) .......................... 202210112535.2
Dec. 19, 2022  (KR) ........................ 10-2022-0178638

(51) Int. Cl.
  *G06T 7/55*   (2017.01)
  *G06T 5/00*   (2024.01)
  *G06T 5/50*   (2006.01)
  *G06T 5/77*   (2024.01)

(52) U.S. Cl.
  CPC .................. *G06T 5/77* (2024.01); *G06T 5/50* (2013.01); *G06T 7/55* (2017.01); *G06T 2207/10024* (2013.01); *G06T 2207/10028* (2013.01); *G06T 2207/20081* (2013.01); *G06T 2207/20084* (2013.01); *G06T 2207/20221* (2013.01)

(58) Field of Classification Search
  CPC .... G06T 5/77; G06T 7/55; G06T 5/50; G06T 2207/10024; G06T 2207/10028; G06T 2207/20081; G06T 2207/20084; G06T 2207/20221
  See application file for complete search history.

(56) References Cited

U.S. PATENT DOCUMENTS

| | | | |
|---|---|---|---|
| 9,542,626 B2 * | 1/2017 | Martinson | G06F 18/2431 |
| 9,633,282 B2 * | 4/2017 | Sharma | G06F 18/214 |
| 10,645,368 B1 * | 5/2020 | Yu | G06T 7/571 |

(Continued)

FOREIGN PATENT DOCUMENTS

| | | |
|---|---|---|
| CN | 109712105 B | 10/2020 |
| CN | 111881706 A | 11/2020 |
| CN | 112560875 A | 3/2021 |

OTHER PUBLICATIONS

Zhang et al. "Deep depth completion of a single rgb-d image." *Proceedings of the IEEE Conference on Computer Vision and Pattern Recognition.* 2018 (pp. 174-185).

(Continued)

*Primary Examiner* — Gregory M Desire
(74) *Attorney, Agent, or Firm* — NSIP Law

(57) ABSTRACT

Disclosed is a method for depth image completion using a depth image completion model, the method including obtaining an original color image and an original depth image corresponding to the original color image, obtaining a first depth image using a first neural network (NN) based on the original color image, obtaining a second depth image using a second NN based on the original depth image, and generating a final depth image by fusing the first depth image and the second depth image.

18 Claims, 8 Drawing Sheets

(56) References Cited

U.S. PATENT DOCUMENTS

| | | | | |
|---|---|---|---|---|
| 10,789,427 | B2* | 9/2020 | Shazeer | G06F 18/10 |
| 10,929,996 | B2* | 2/2021 | Angelova | G06N 3/044 |
| 11,057,646 | B2* | 7/2021 | Hodgkinson | H04N 19/865 |
| 11,144,818 | B2* | 10/2021 | Ambrus | G06T 7/70 |
| 11,145,061 | B2* | 10/2021 | Lee | G06V 10/82 |
| 11,238,601 | B2* | 2/2022 | Guizilini | G06T 7/593 |
| 11,508,037 | B2* | 11/2022 | Yang | G06T 5/30 |
| 11,723,630 | B2* | 8/2023 | Lv | G16H 30/40 600/452 |
| 12,056,858 | B2* | 8/2024 | Kim | G06T 5/60 |
| 12,148,200 | B2* | 11/2024 | Lu | G06V 10/7715 |

OTHER PUBLICATIONS

Hua et al. "A normalized convolutional neural network for guided sparse depth upsampling." *IJCAI*. 2018 (pp. 2283-2290).

Ma et al. "Sparse-to-dense: Depth prediction from sparse depth samples and a single image." *2018 IEEE international conference on robotics and automation (ICRA)*. IEEE, Feb. 26, 2018 (pp. 1-8).

Cheng et al. "Depth estimation via affinity learned with convolutional spatial propagation network." *Proceedings of the European Conference on Computer Vision (ECCV)*. Aug. 1, 2018 (pp. 1-17).

Li et al. "High-quality 3d reconstruction with depth super-resolution and completion." *IEEE Access* vol. 7. Feb. 22, 2019 (pp. 19370-19381).

Imran et al. "Depth coefficients for depth completion." *2019 IEEE/CVF Conference on Computer Vision and Pattern Recognition (CVPR)*. IEEE, Mar. 13, 2019 (pp. 1-10).

Qiu et al. "Deeplidar: Deep surface normal guided depth prediction for outdoor scene from sparse lidar data and single color image." *Proceedings of the IEEE/CVF Conference on Computer Vision and Pattern Recognition*. Apr. 9, 2019 (pp. 1-10).

Yang et al. "Dense depth posterior (ddp) from single image and sparse range." *Proceedings of the IEEE/CVF Conference on Computer Vision and Pattern Recognition*. Apr. 17, 2019 (pp. 1-11).

Huang et al. "Indoor depth completion with boundary consistency and self-attention." *Proceedings of the IEEE/CVF International Conference on Computer Vision Workshops*. Jun. 9, 2019 (pp. 1-9).

Shivakumar et al. "Dfusenet: Deep fusion of rgb and sparse depth information for image guided dense depth completion." *2019 IEEE Intelligent Transportation Systems Conference (ITSC)*. IEEE, Jul. 10, 2019 (pp. 1-8).

Eldesokey et al. "Confidence propagation through cnns for guided sparse depth regression." *IEEE transactions on pattern analysis and machine intelligence 42.10* Aug. 5, 2019 (pp. 1-14).

Tang et al. "Learning guided convolutional network for depth completion." *IEEE Transactions on Image Processing 30*, Aug. 3, 2019 (pp. 1-13).

Li et al. "A multi-scale guided cascade hourglass network for depth completion." *Proceedings of the IEEE/CVF Winter Conference on Applications of Computer Vision*. 2020 (pp. 32-40).

Park et al. "Non-local spatial propagation network for depth completion." *Computer Vision—ECCV 2020: 16th European Conference, Glasgow, UK, Aug. 23-28, 2020, Proceedings, Part XIII 16. Springer International Publishing*, Jul. 20, 2020 (pp. 1-16).

Cheng et al. "Cspn++: Learning context and resource aware convolutional spatial propagation networks for depth completion." *Proceedings of the AAAI Conference on Artificial Intelligence*. vol. 34 No. 07. Nov. 22, 2020 (pp. 1-9).

Liu et al. "FCFR-Net: Feature Fusion based Coarse-to-Fine Residual Learning for Monocular Depth Completion." *arXiv preprint arXiv:2012.08270*, Dec. 12, 2020 (pp. 1-9).

Senushkin et al. "Decoder modulation for indoor depth completion." *2021 IEEE/RSJ International Conference on Intelligent Robots and Systems (IROS)*. IEEE, Feb. 8, 2021 (pp. 1-11).

Hu et al. "Penet: Towards precise and efficient image guided depth completion." *2021 IEEE International Conference on Robotics and Automation (ICRA)*. IEEE, Mar. 18, 2021 (pp. 1-7).

Liu et al. "Fcfr-net: Feature fusion based coarse-to-fine residual learning for depth completion." *Proceedings of the AAAI conference on artificial intelligence*. vol. 35 No. 3. Aug. 17, 2021 (pp. 1-9).

* cited by examiner

METHOD AND DEVICE FOR DEPTH IMAGE COMPLETION

CROSS-REFERENCE TO RELATED APPLICATIONS

This application claims the benefit under 35 USC § 119(a) of Chinese Patent Application No. 202210112535.2 filed on Jan. 29, 2022, in the China National Intellectual Property Administration, and Korean Patent Application No. 10-2022-0178638 filed on Dec. 19, 2022, in the Korean Intellectual Property Office, the entire disclosures of which are incorporated herein by reference for all purposes.

BACKGROUND

1. Field

The following disclosure relates to image processing, and more particularly, to a method and device with depth image completion.

2. Description of Related Art

Depth images are generally images whose elements (pixels) are respective depth values at respective directions (typically a view/projection) from a reference point. The depth values may be distances (depths) from the reference point to closest line-of-sight physical points (rays) in the respective directions of the reference points, which may be, for example, the location of a depth-capturing sensor.

Depth image completion, also known as depth restoration or reconstruction, aims to restore low-quality depth images generated by a physical sensor. Among its many uses, depth image completion is often used for autonomous robotics, autonomous driving, three-dimensional (3D) reconstruction, and augmented reality, to name some examples. The quality of depth images can affect the quality of application results, for example, the quality of results of 3D-based face recognition technologies. However, current consumer-grade depth cameras/sensors have problems such as poor image quality, sparsity of depth data in images, or missing depth values such as holes. Current depth image completion algorithms are mainly divided into two categories: one is a traditional method based on filtering, and the other is a deep learning method that fills depth values by building a regression model.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a method for depth image completion using a depth image completion model including a first neural network (NN) and a second NN includes obtaining an original color image and an original depth image corresponding to the original color image, obtaining a first depth image using the first NN based on the original color image, obtaining a second depth image using the second NN based on the original depth image, and generating a final depth image by fusing the first depth image and the second depth image, wherein the first NN may include a first encoder network including cascaded first N-layer residual blocks, and a first decoder network including cascaded second N-layer residual blocks, and the second NN may include a second encoder network including cascaded third N-layer residual block, and a second decoder network including cascaded fourth N-layer residual blocks.

In this case, the obtaining of the first depth image and the obtaining of the second depth image may include performing channel shuffling on a first encoded feature image output from each of the first N-layer residual blocks and a second encoded feature image output from each of the third N-layer residual blocks respectively corresponding to the first N-layer residual blocks, providing the channel-shuffled first encoded feature image to a next first N-layer residual block, or outputting the channel-shuffled first encoded feature image to the first encoder network in response to the next first N-layer residual block being absent, and providing the channel-shuffled second encoded feature image to a next third N-layer residual block, or outputting the channel-shuffled second encoded feature image to the second encoder network in response to the next third N-layer residual block being absent.

In this case, the channel shuffle may exchange channel feature images of a predetermined number of channels of the first encoded feature image output from each of the first N-layer residual blocks with channel feature images of the predetermined number of channels of the second encoded feature image output from each of the third N-layer residual blocks respectively corresponding to the first N-layer residual blocks.

In this case, the first NN may further include a first dilated convolution unit before the second N-layer residual blocks, the second NN may further include a second dilated convolution unit before the fourth N-layer residual blocks, and the obtaining of the first depth image and the obtaining of the second depth image may include inputting a first hole-feature image output from the first dilated convolution unit into a first residual block of the second N-layer residual blocks of the first decoder network, in response to a first encoded feature image output from a last residual block of the first N-layer residual blocks of the first encoder network being input into the first dilated convolution unit, and inputting a second hole-feature image output from the second dilated convolution unit into a first residual block of the fourth N-layer residual blocks of the second decoder network, in response to a second encoded feature image output from a last residual block of the third N-layer residual blocks of the second encoder network being input into the second dilated convolution unit.

In this case, the inputting of the second hole-feature image output from the second dilated convolution unit into the first residual block of the fourth N-layer residual blocks of the second decoder network may include, before inputting the second hole-feature image output from the second dilated convolution unit into the first residual block of the fourth N-layer residual blocks of the second decoder network, performing feature alignment on the first hole-feature image and the second hole-feature image based on the first hole-feature image and the second hole-feature image, and inputting the feature-aligned second hole-feature image into the first residual block of the fourth N-layer residual blocks of the second decoder network.

In this case, the performing of the feature alignment on the first hole-feature image and the second hole-feature image may include obtaining a third spliced feature image by splicing the first hole-feature image and the second hole-feature image, obtaining a pixel position offset of the first hole-feature image based on the third spliced feature image, obtaining a corrected first hole-feature image by correcting a pixel position of the first hole-feature image based on the pixel position offset of the first hole-feature image, obtaining a fourth spliced feature image by splicing the second hole-feature image and the corrected first hole-feature image, and obtaining the feature-aligned second hole-feature image by processing convolution on the fourth spliced feature image.

In this case, the obtaining of the second depth image may include performing, based on a first decoded feature image output from each of the second N-layer residual blocks and a second decoded feature image output from each of the fourth N-layer residual blocks respectively corresponding to the second N-layer residual blocks, feature alignment on the first decoded feature image and the second decoded feature image, and providing the feature-aligned second decoded feature image to a next fourth N-layer residual block, or outputting the feature-aligned second decoded feature image to the second decoder network in response to the next fourth N-layer residual block being absent.

In this case, the performing of the feature alignment on the first decoded feature image and the second decoded feature image may include obtaining a first spliced feature image by splicing the first decoded feature image output from each of the second N-layer residual blocks and the second decoded feature image output from each of the fourth N-layer residual blocks respectively corresponding to the second N-layer residual blocks, obtaining a pixel position offset of the first decoded feature image based on the first spliced feature image, obtaining a corrected first decoded feature image by correcting a pixel position of the first decoded feature image based on the pixel position offset of the first decoded feature image, obtaining a second spliced feature image by splicing the second decoded feature image and the corrected first decoded feature image, and obtaining the feature-aligned second decoded feature image by processing convolution on the second spliced feature image.

In this case, the second NN may further include a squeeze-excitation (SE) block, and the providing of the feature-aligned second decoded feature image to the next fourth N-layer residual block, or outputting of the feature-aligned second decoded feature image to the second decoder network in response to the next fourth N-layer residual block being absent may include, before providing the feature-aligned second decoded feature image to a next fourth N-layer residual block, or outputting the feature-aligned second decoded feature image to the second decoder network in response to the next fourth N-layer residual block being absent, obtaining a fused feature image by fusing, through the SE block, the feature-aligned second decoded feature image and the second encoded feature image input from each of the third N-layer residual blocks corresponding to the fourth N-layer residual blocks, and providing the fused feature image to a next fourth N-layer residual block, or outputting the fused feature image to the second decoder network in response to the next fourth N-layer residual block being absent.

In this case, the first NN may further include a first preprocessing unit, the second NN further may include a second preprocessing unit, and the obtaining of the first depth image and the obtaining of the second depth image may include obtaining a color feature image by inputting the original color image into the first preprocessing unit, obtaining a depth feature image by inputting the original depth image into the second preprocessing unit, and performing channel shuffling on the color feature image and the depth feature image, inputting the channel-shuffled color feature image into the first encoder network, and inputting the channel-shuffled depth feature image into the second encoder network.

In this case, the first NN may further include a first depth predictor, the second NN may further include a second depth predictor, the obtaining of the first depth image may include obtaining the first depth image by inputting a first decoded feature image output from the first decoder network into the first depth predictor, and the obtaining of the second depth image may include obtaining the second depth image by inputting a second decoded feature image output from the second decoder network into the second depth predictor.

In this case, the depth image completion model may further include an attention processing unit, and the generating of the final depth image by fusing the first depth image and the second depth image may include obtaining a first pixel weight map of the first depth image and a second pixel weight map of the second depth image using the attention processing unit, and obtaining the final depth image by weighting and summing the first depth image and the second depth image based on the first pixel weight map and the second pixel weight map.

In this case, the third N-layer residual blocks of the second encoder network and the fourth N-layer residual blocks of the second decoder network may be implemented using gated convolution.

In this case, the method may further include obtaining the depth image completion model by training the depth image completion model using a loss function, wherein the loss function may be obtained based on a first mean squared error loss between the first depth image and a real depth image, a second mean squared error loss between the second depth image and the real depth image, and a third mean squared error loss between the final depth image and the real depth image, or may be obtained based on the first mean squared error loss, the second mean squared error loss, the third mean squared error loss, and a structural loss between the final depth image and the real depth image, and the structural loss may be a value obtained by subtracting a structural similarity from "1".

In this case, the obtaining of the original color image and the original depth image corresponding to the original color image may include obtaining a depth image having a pixel value of "0" as the original depth image corresponding to the original color image, in response to the corresponding original depth image being absent.

In another general aspect, a device for depth image completion using a depth image completion model including a first NN and a second NN includes an image obtainer configured to obtain an original color image and an original depth image corresponding to the original color image, the first NN configured to obtain a first depth image based on the original color image, the second NN configured to obtain a second depth image based on the original depth image, and a fuser configured to generate a final depth image by fusing the first depth image and the second depth image, wherein the first NN may include a first encoder network including cascaded first N-layer residual blocks, and a first decoder network including cascaded second N-layer residual blocks, and the second NN may include a second encoder network including cascaded third N-layer residual block, and a second decoder network including cascaded fourth N-layer residual blocks.

In this case, the first NN and the second NN may be configured to perform channel shuffling on a first encoded feature image output from each of the first N-layer residual blocks and a second encoded feature image output from each of the third N-layer residual blocks respectively corresponding to the first N-layer residual blocks, provide the channel-shuffled first encoded feature image to a next first N-layer residual block, or output the channel-shuffled first encoded feature image to the first encoder network in response to the next first N-layer residual block being absent, and provide the channel-shuffled second encoded feature image to a next third N-layer residual block, or output the channel-shuffled second encoded feature image to the second encoder network in response to the next third N-layer residual block being absent.

In this case, the first NN may further include a first dilated convolution unit before the second N-layer residual blocks, the first dilated convolution unit may be configured to input a first hole-feature image into a first residual block of the second N-layer residual blocks of the first decoder network, in response to a first encoded feature image output from a last residual block of the first N-layer residual blocks of the first encoder network being input thereinto, the second NN may further include a second dilated convolution unit and a feature alignment unit before the fourth N-layer residual blocks, the second dilated convolution unit may be configured to output a second hole-feature image in response to a second encoded feature image output from a last residual block of the third N-layer residual blocks of the second encoder network being input thereinto, and the feature alignment unit may be configured to perform feature alignment on the first hole-feature image and the second hole-feature image based on the first hole-feature image and the second hole-feature image, and input the feature-aligned second hole-feature image into the first residual block of the fourth N-layer residual blocks of the second decoder network.

In this case, the second decoder network may further include a feature alignment unit configured to perform, based on a first decoded feature image output from each of the second N-layer residual blocks and a second decoded feature image output from each of the fourth N-layer residual blocks respectively corresponding to the second N-layer residual blocks, feature alignment on the first decoded feature image and the second decoded feature image, and an SE block configured to obtain a fused feature image by fusing, through the SE block, the feature-aligned second decoded feature image and the second encoded feature image input from each of the third N-layer residual blocks corresponding to the fourth N-layer residual blocks, and provide the fused feature image to a next fourth N-layer residual block, or output the fused feature image to the second decoder network in response to the next fourth N-layer residual block being absent.

In this case, the fuser may further include an attention processing unit, and may be configured to obtain a first pixel weight map of the first depth image and a second pixel weight map of the second depth image using the attention processing unit, and obtain the final depth image by weighting and summing the first depth image and the second depth image based on the first pixel weight map and the second pixel weight map.

Other features and aspects will be apparent from the following detailed description, the drawings, and the claims.

Figure 1:
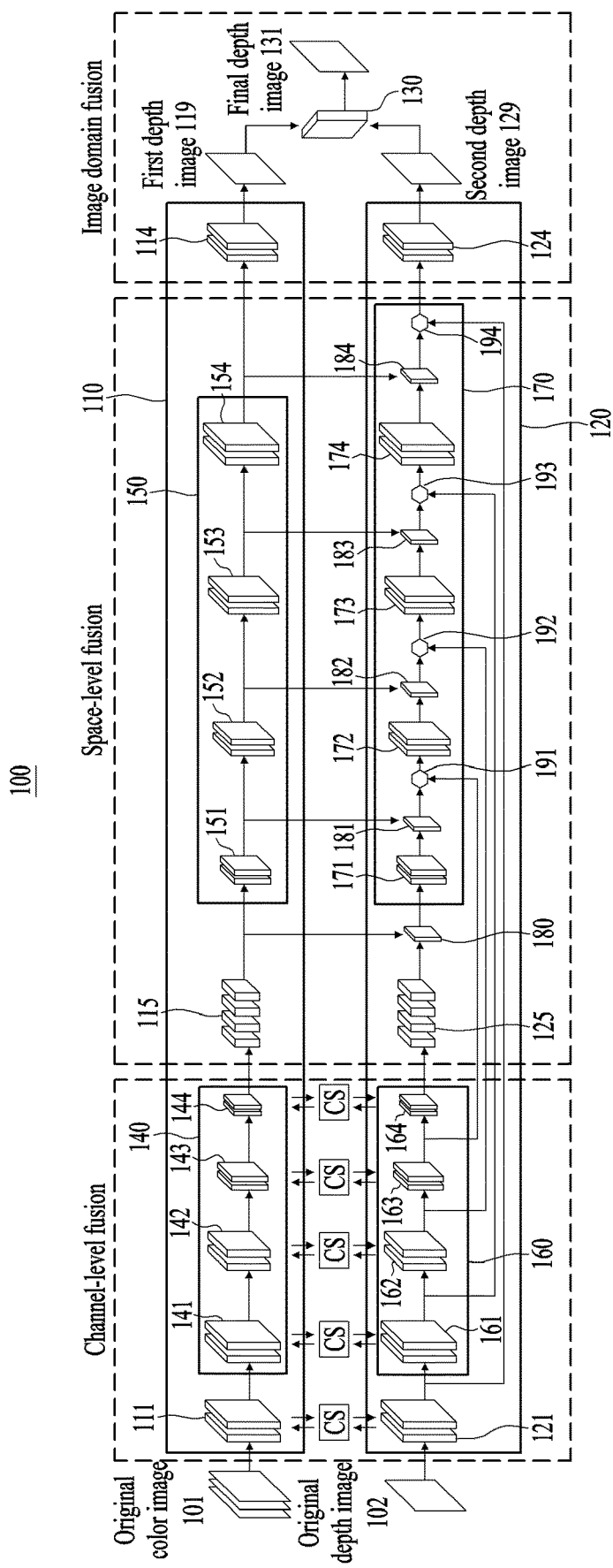
FIG. 1 illustrates an example of a depth image completion model, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

As noted in the Background, depth image restoration has mainly been divided into two categories: traditional methods based on filtering, and deep learning methods. The traditional method is mainly based on filtering and Markov random field to expand and fill a depth image and to constrain the same by means of texture information (e.g., edges) to obtain a complete (restored) depth image. The results of this method usually have issues of chaotic deep texture structure and unclear edges. Also, due to the need for a large number of manually designed features, this type of method is usually difficult to migrate to new tasks and new datasets.

Depth image completion methods based on deep learning establish a mapping from an original depth image to a complete depth image by constructing a regression model. Depending on whether information from RGB (red, green, blue) images is used, these methods may be divided into two categories: depth completion using RGB images for guidance and depth completion directly regressed from depth images. The method of regression directly from depth images usually uses an encoder-decoder network (EDN), a generative adversarial network (GAN), and/or the like to establish a corresponding regression model (neural network). This method of establishing a single regression model has achieved practical results in the field of color image restoration. However, results of depth restoration are often used in applications that require accurate depth information, and the aforementioned method often has issues in causing an output depth image to be blurred and edges to be unclear due to simple interpolation or copying of adjacent pixels. The RGB-guided depth completion method mines information in the RGB image through feature extraction and feature fusion, and the mined information then informs the depth completion process. Compared with the method of performing regression directly from a single depth image, the RGB-guided method can provide a definable accuracy improvement. However, extracting color image information and fusing two types of image information is too simple, resulting in the destruction of the original depth structure or texture information of a generated depth image and difficulty in processing a depth image with a missing large area. Following are some issues, observed only by the instant inventors, of existing deep learning-based methods.

To obtain better completion, manual extraction of image features can be used to increase the intermediate representation of depth information. For example, a surface normal, an occlusion edge (occlusion boundary), and the like can be used as intermediate representations from color maps to depth maps to reduce the difficulty of network prediction at each stage in a two-stage network structure, and finally, a complete depth image is obtained through the global optimization strategy. As another example, an independent branch network may be designed to learn a representation of intermediate features of a depth map, and then the intermediate features are spliced with an RGB image and an original depth image to predict a depth. With this type of method, the effect of depth completion largely depends on the quality of manually extracted features or intermediate representation generation and the fusion strategy of these features. As a result, the depth completion results are uneven.

To fuse depth image features and color image features, element-wise addition or channel-wise splicing can be adopted to fuse the two types of features. However, in the process of network processing, due to the lack of original images, two modal features undergo different degrees of deformation and displacement after operations such as convolution and downsampling. This change can cause key point positions of color features and corresponding depth features to differ. Therefore, simple addition or splicing may lead to information confusion between color features and deep features, resulting in the inability of the network to effectively learn the correspondence between the two features. For example, depth features and color features may be spliced, and then, sparse depth densification may be performed using a simple codec. The completed depth map is often blurred and there may be significant edge loss. Another example is to use a pyramid network to extract multi-level features of a depth image and an RGB image and fuse the features in an input part of a decoder. The obtained depth image often has issues of low texture restoration and incomplete structure.

Dynamic filtering and guided filtering has high complexity in implementation and a large amount of calculation and thus, causes a high delay in the implementation process. Moreover, these methods can be difficult to apply in actual scenarios.

Embodiments described herein may provide progressive scene depth completion based on dual-domain fusion. Specifically, a depth image completion model may include two branch networks, namely, a color image branch network and a depth image branch network. The color branch network and the depth branch network are respectively implemented to estimate a depth using an original color image and an original depth image (generally captured concurrently). The two branches may obtain two respective depth images, and the two depth images may be fused to obtain a completed depth image. During this process, color information and depth information may be fully fused in a feature domain and in an image domain respectively, RGB information and depth information may be fully fused, and the quality of depth image completion may be improved.

Fusion of feature domains may be divided into two dimensions: channel and space. In the spatial dimension, a feature alignment unit may align color features with depth features, generate an offset of the corresponding color features based on the depth features, calibrate the color features in a deformable convolution using the generated offset, and alleviate the mismatch of key point information caused by feature deformation or offset during the fusion process, thereby enhancing the multi-modal fusion ability of an overall neural network. In the channel dimension, channels of color features and depth features may first be scrambled and reorganized through channel shuffle, so that the color and depth features may be fully exchanged, which may effectively promote the fusion of multi-modal information. In addition, the fusion of an image domain may also use an attention mechanism to fuse the two depth images output from the respective color branch network and the depth branch network, which may enhance the fusion effect of the depth image and may improve performance of the depth image completion model.

In the space dimension, a receptive field of the network may be expanded through dilated convolution, so that the network may capture more distant information, thereby enhancing the judgment ability of the network. In addition, in the channel dimension, a squeeze-excitation (SE) block may be used to perform channel fusion on an image channel by means of an attention mechanism, so that the network may adaptively learn the weights of two modal features, thereby better fusing the two features.

To enable the network to distinguish between effective pixels and invalid pixels in an image (so that the generated depth image may better retain the original depth information), the depth branch network may use gated convolution to transmit mask information. A gate operation in gated convolution may effectively identify positions of effective pixels and invalid pixels, and the resulting weights of the effective pixels may be higher than those of the invalid pixels.

To provide depth images rich in detail and high in edge quality, training a depth image completion model may be supplemented with structure loss monitoring related to a structural similarity index measure (SSIM).

In addition, some depth image completion models described herein may be trained end-to-end, thus avoiding the use of manual intermediate features, and effectively avoiding the risk of poor quality of intermediate features. In addition, the strategy of dynamically adjusting a convolution kernel and a filter kernel may be avoided, which may provide a noticeably faster running speed than a method of dynamically guiding a filter class. In addition, depth image completion methods described herein may improve the imaging quality of 3D sensors such as LiDAR and time of flight (ToF), so that devices (e.g., self-driving cars, mobile phones, etc.) equipped with such 3D sensors may better perform 3D modeling and detection. Good results may be achieved on both depth hole-filling and sparse depth densification tasks.

Hereinafter, examples of depth image completion methods and devices are described with reference to FIGS. 1 to 8.

FIG. 1 illustrates an example of a depth image completion model, according to one or more embodiments.

Referring to FIG. 1, a depth image completion model 100 may include a first deep neural network (DNN) (i.e., a color branch network) 110, a second DNN (i.e., a depth branch network) 120, and a fuser 130.

The first DNN 110 is used to perform depth estimation based on an original color image (e.g., an RGB image) to obtain a depth image. Accordingly, an input of the first DNN 110 may be an original color image 101 and an output thereof may be a first depth image 119. The second DNN 120 is used to perform depth estimation based on an original depth image to obtain a depth image. Accordingly, an input of the second DNN 120 may be an original depth image 102, and an output thereof may be a second depth image 129. Note that the term "original" does not preclude some initial image pre-processing.

In the first DNN 110 and the second DNN 120, operations of channel-level feature fusion (e.g., channel shuffle, etc.) and space-level feature fusion (e.g., feature alignment, etc.) may be performed so that color information may be fully integrated with depth information. The fuser 130 may be used to fuse the first depth image and the second depth image 129 to generate a final depth image 131 that is a restored/synthetic depth image. Here, the original color image 101 and the original depth image 102 may be obtained in any way, for example by pairing and calibrating a color camera and a depth camera at the same position to capture the same scene at the same time and then registering the two images obtained, or may be obtained from a local memory or a local database as necessary, or may be received from an external data source (e.g., the Internet, a server, a database, etc.) through an input device or a transmission medium. The original color image 101 and the original depth image 102 may be images corresponding to each other. For example, the original color image 101 and the original depth image 102 collected by a sensor may be projected onto the same coordinate system through image registration, so that pixels of the two images may have one-to-one correspondence. The origin of the original images is not significant and the term "original" is only used to distinguish from the final restored depth image.

In some embodiments, the main structure of the first DNN 110 may include an encoder-decoder network (sometimes also referred to as an auto-encoder) formed by stacking residual blocks. A residual structure/component may effectively improve the effect of transferring low-level features of the network to a high level, so that the network may retain texture information and structural information in the low-level features. For example, the first DNN 110 may include a first encoder network 140 including cascaded N-layer (e.g., 4-layer) residual blocks and a first decoder network 150 including cascaded N-layer residual blocks. Here, N is an integer greater than "1". In addition, the first DNN 110 may further include a first preprocessing unit 111 before a codec network (e.g., the first encoder network 140 and the first decoder network 150), and a first depth predictor 114 after the codec network (e.g., the first encoder network 140 and the first decoder network 150). In addition, the first DNN 110 may further include a first dilated convolution unit 115 before the N-layer residual blocks.

The structure of the second DNN 120 may be similar to that of the first DNN 110, and the main structure thereof may also include a codec network formed by stacking residual blocks. For example, the second DNN 120 may include a second encoder network 160 including cascaded N-layer residual blocks, and a second decoder network 170 including cascaded N-layer residual blocks. In addition, the second DNN 120 may further include a second preprocessing unit 121 before the codec network (e.g., the second encoder network 160 and the second decoder network 170), and a second depth predictor 124 after the codec network (e.g., the second encoder network 160 and the second decoder network 170). In addition, the second DNN 120 may further include a second dilated convolution unit 125 before the N-layer residual blocks. Each network in the second preprocessing unit 121, the second encoder network 160, the second decoder network 170, and the second depth predictor 124 may perform a similar function as the corresponding network in the first DNN 110.

Differences between the second DNN 120 and the first DNN 110 may include the following. (1) The second DNN 120 may further include feature alignment units 180, 181, 182, 183, and 184 after each residual block in the dilated convolution unit 125 and the second decoder network 170. The feature alignment units 180, 181, 182, 183, and 184 may be used to generate an offset of a corresponding color branch feature based on a depth branch feature, calibrate the color branch feature using deformable convolution based on the generated offset, and fuse the aligned color branch feature and the depth branch feature. In addition, after the feature alignment units 180, 181, 182, 183, and 184, the second DNN 120 may further include SE blocks 191, 192, 193, and 194 used to adaptively fuse the fused features with features of a corresponding layer of the depth branch encoder network. (2) Each residual block in the second encoder network 160 and the second decoder network 170 may adopt gated convolution, that is, a gate operation may be added after each convolutional layer.

Hereinafter, operations of an encoding phase in the first DNN 110 and the second DNN 120 are described in detail. The encoding phase may include a preprocessing operation and an encoding operation.

The first preprocessing unit 111 may transform the input original color image 101 into a color feature image suitable for DNN processing. For example, the first preprocessing unit 111 may include at least one convolutional layer. The first preprocessing unit 111 may perform convolution processing on the original color image 101 without changing the size. Likewise, the second preprocessing unit 121 may transform the input original depth image 102 into a depth feature image (or feature map) suitable for DNN processing. For example, the second preprocessing unit 121 may include at least one convolutional layer. The second preprocessing unit 121 may perform convolution processing on the original depth image 102 without changing the size.

The first encoder network 140 may perform feature encoding on the color feature image through the cascaded N-layer residual blocks (here, the residual blocks are encoding units with a residual structure), where N is an integer greater than 1. Encoding units 141, 142, 143, and 144 of each layer in the first encoder network 140 may include cascaded residual blocks, and each residual block may perform at least one convolution process on the input feature image, and the last residual block may perform at least one convolution process and one downsampling process on the input feature image. Here, the value of N, the number of residual blocks, and the number of convolutions performed by the residual blocks are not limited thereto. As shown in FIG. 1, the first encoder network 140 may include four encoding units 141, 142, 143, and 144. Each of the encoding units 141, 142, 143, and 144 may include two residual blocks, each residual block may include two convolutional layers, and the last residual block may include two convolutional layers and one downsampling layer (e.g., downsampling by a factor of ½). Therefore, the resolution of the feature image output from the first encoder network 140 may be 1/16 of the resolution of the input color feature image. Therefore, the resolution of the input original color image 101 may be an integer multiple of 16, for example, 304×224. In addition, each residual block may further include a normalization layer (e.g., a batch normalization layer) and an activation layer (e.g., a PReLU layer), the normalization layer may perform a normalization operation on an input feature image to make output features have the same scale, and the activation layer may non-linearize the normalized feature image.

The second encoder network 160 may perform feature encoding based on the original depth image 102 through cascaded N-layer encoding units 161, 162, 163, and 164 having a residual structure, where N is an integer greater than "1". Encoding units 161, 162, 163, and 164 of each layer in the second encoder network 160 may include cascaded residual blocks, and each residual block may perform at least one convolution process on the input feature image, and the last residual block may perform at least one convolution process and one downsampling process on the input feature image. The value of N, the number of residual blocks, and the number of convolutions performed by the residual blocks are not limited. In addition, each residual block performs a gating process after each convolution process, which will be described in detail below. For example, the second encoder network 160 may include four encoding units 161, 162, 163, and 164. Each of the encoding units 161, 162, 163, and 164 may include two residual blocks, each residual block may include two convolutional layers, and the last residual block may include two convolutional layers and one downsampling layer (downsampling by a factor of ½, for example). Therefore, the resolution of the feature image output from the second encoder network 160 may be 1/16 of the resolution of the input feature image. Therefore, the resolution of the original depth image 102 may be an integer multiple of "16", for example, 304×224. In addition, each residual block may further include a normalization layer (e.g., a batch normalization layer) and an activation layer (e.g., a PReLU layer), wherein the normalization layer may perform a normalization operation on an input feature image to make output features have the same scale, and the activation layer may non-linearize the normalized feature image.

In some embodiments, in order to fully integrate and exchange features of a color image and features of a depth image, the features of each layer of the color branch network in the encoding network may be exchanged with the features of the corresponding depth branch network through channel shuffle, thus enabling information of both modals may be fully integrated.

Figure 2:
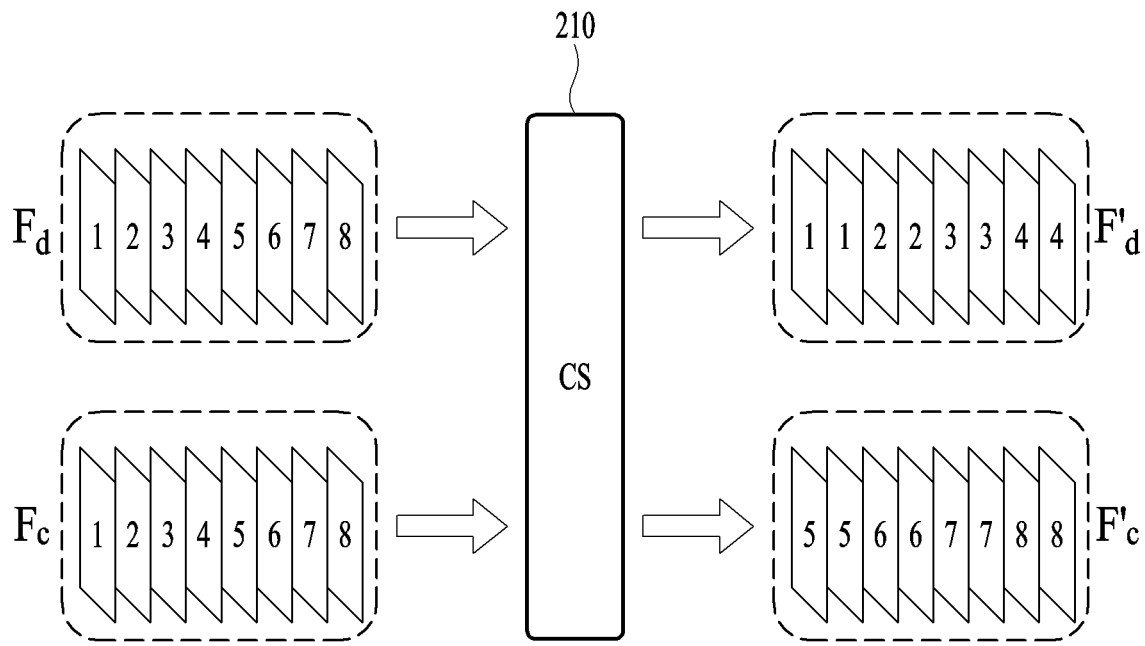
FIG. 2 illustrates an example of channel shuffling, according to one or more embodiments.

FIG. 2 illustrates an example of channel shuffle, according to one or more embodiments.

Referring to FIG. 2, $F_c$ and $F_d$ respectively represent a color branch feature (e.g., the feature image/map output from the first preprocessing unit 111 and the feature image/map output from the residual block of each layer in the first encoder network 140) and a depth branch feature (e.g., the feature image output from the second preprocessing unit 121 and the feature image output from the residual block of each layer in the second encoder network 160). A channel shuffle operation 210 may split features by its channel dimension, and exchange features of a predetermined number of feature channels (e.g., half the number of feature channels) of a depth branch with features of the predetermined number of feature channels of a color branch to generate new features $F_c'$ and $F_d'$. After the channel shuffle operation, feature information of two image domains may be fully exchanged and fused, which may effectively promote the fusion effect of multi-modal information. Although FIG. 2 shows the features of the first half of the channels of $F_c$ and $F_d$ as mixed to obtain $F_d'$ and the features of the second half of the channels of $F_c$ and $F_d$ as mixed to obtain $F_c'$, the channel shuffle of the present disclosure is not limited to this technique. For example, for $F_c$ and $F_d$, channel feature images of half the number of channels may be randomly selected and exchanged to generate $F_c'$ and $F_d'$.

Referring to FIG. 1, operations of a decoding phase in the first DNN 110 and the second DNN 120 are described in detail below. The decoding phase may include a dilated convolution operation, a decoding operation, and a depth prediction operation.

The first dilated convolution unit 115 may include dilated convolutional layers of a predetermined number of layers (e.g., 1 layer). The first dilated convolution unit 115 may receive an encoded feature image output from the last residual block of the first encoder network 140. In addition, the first dilated convolution unit 115 may output a first hole-feature image generated by performing convolution on the encoded feature image output from the last residual block of the first encoder network 140 to a first residual block of the first decoder network 150.

Similarly, the second dilated convolution unit 125 may include dilated convolutional layers of a predetermined number of layers (e.g., 1 layer). The second dilated convolution unit 125 may receive an encoded feature image output from the last residual block of the second encoder network 160. The second dilated convolution unit 125 may output a second hole-feature image generated by performing convolution on the encoded feature image output from the last residual block of the second encoder network 160 to a first residual block of the second decoder network 170. A hole-feature image may be an image (or feature map) that includes information of holes, i.e., image regions where there may be no (or reduced/sparse) depth data.

Meanwhile, the second DNN 120 may include a feature alignment unit 180 after the second dilated convolution unit 125. The feature alignment unit 180 may perform feature alignment on the first hole feature image and the second hole feature image based on the first hole-feature image output from the first dilated convolution unit 115 and the second hole-feature image output from the second dilated convolution unit 125, and input the feature-aligned second hole-feature image into the first residual block of the second decoder network 170. Specifically, the feature alignment unit 180 may perform feature alignment on the first hole-feature image based on the first hole-feature image output from the first dilated convolution unit 115 and the second hole-feature image output from the second dilated convolution unit 125, fuse the second hole-feature image and the feature-aligned first hole-feature image, and input the fused second hole-feature image into the first residual block of the second decoder network 170.

Figure 3:
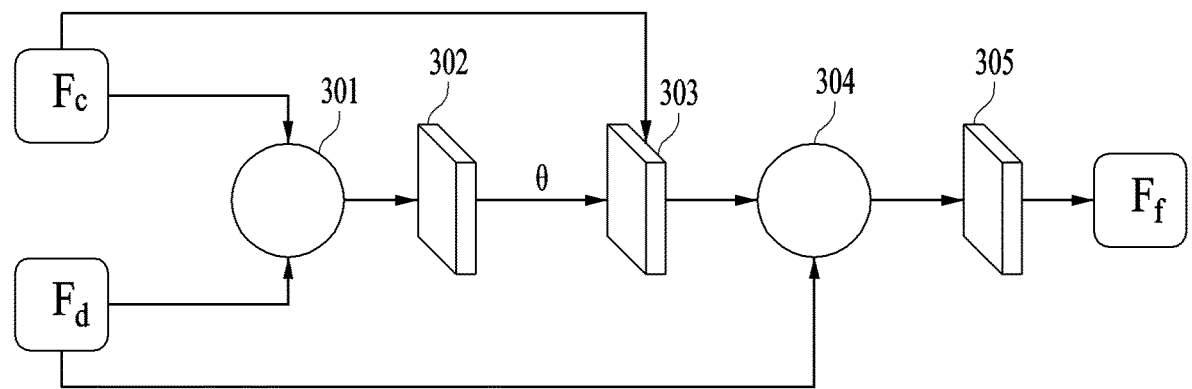
FIG. 3 illustrates an example of feature alignment, according to one or more embodiments.

FIG. 3 illustrates an example of feature alignment, according to one or more embodiments.

Referring to FIG. 3, firstly, a color branch feature $F_c$ (e.g., a first hole-feature image) and a depth branch feature $F_d$ (e.g., a second hole-feature image) may be spliced in operation 301, and an offset group $\theta$ may be generated through an offset generator 302. For example, in the case of a 3×3 convolution kernel, an offset may include eight sets of coordinates, which respectively represent position offsets of eight adjacent pixel coordinates in two-dimensional (2D) space. The offset may be input into a deformable convolution 303 for spatially correcting the color branch feature $F_c$ to eliminate a spatial position difference of the color branch feature $F_c$ relative to the depth branch feature $F_d$. The corrected color branch feature and the depth branch feature $F_d$ may be spliced in operation 304, and then fused in operation 305 by convolution to generate a fused feature $F_f$.

Referring back to FIG. 1, the first decoder network 150 may perform feature decoding on the feature image output from the first encoder network 140 by the cascaded N-layer residual blocks (here, the residual blocks are decoding units with a residual structure). That is to say, the first decoder network 150 may sample the same residual structure, and restore the resolution of the image to the original resolution through a corresponding number of deconvolution operations (implemented by upsampling and convolution).

Specifically, decoding units 151, 152, 153, and 154 of each layer in the first decoder network 150 may include a plurality of cascaded residual blocks, and each residual block may perform at least one convolution process on the input feature image, and the first residual block may perform one upsampling process and at least one convolution process on the input feature image. Here, the value of N, the number of residual blocks, and the number of convolutions performed by the residual blocks are not limited thereto. For example, the first decoder network 150 may include four corresponding decoding units 151, 152, 153, and 154. Each of the decoding units 151, 152, 153, and 154 may include two residual blocks. Each residual block may include two convolutional layers, and the first residual block may include one upsampling layer (e.g., an upsampling factor is "2") and two convolutional layers. Accordingly, the resolution of the feature image output from the first decoder network 150 may be restored to the original resolution. In addition, each residual block may further include a normalization layer (e.g., a batch normalization layer) and an activation layer (e.g., a PReLU layer). The normalization layer may perform a normalization operation on an input feature image to make output features have the same scale, the activation layer may non-linearize the normalized feature image.

Similarly, decoding units 171, 172, 173, and 174 of each layer in the second decoder network 170 may include a plurality of cascaded residual blocks, and each residual block may perform at least one convolution process on the input feature image, and the first residual block may perform one upsampling process and at least one convolution process on the input feature image. Here, the value of N, the number of residual blocks, and the number of convolutions performed by the residual blocks are not limited thereto. In addition, each residual block performs one gating process after each convolution process, which will be described in detail below. For example, the first decoder network 150 may include four corresponding decoding units 171, 172, 173, and 174, and each decoding unit may include two residual blocks. Each residual block may include two convolutional layers, and the first residual block may include one upsampling layer (e.g., an upsampling factor is "2") and two convolutional layers. Accordingly, the resolution of the feature image output from the first decoder network 150 may be restored to the original resolution. In addition, each residual block may further include a normalization layer (e.g., a batch normalization layer) and an activation layer (e.g., a PReLU layer). The normalization layer may perform a normalization operation on an input feature image to make output features have the same scale, the activation layer may non-linearize the normalized feature image.

In addition, the second decoder network 170 may further include feature alignment units 181, 182, 183, and 184 after each residual block. The feature alignment units 181, 182, 183, and 184 after the residual block of each layer may align features of a first decoded feature image output from the residual block of each layer in the first decoder network 150 and a second decoded feature image output from the residual block of a corresponding layer in the second decoder network 170 based on the first decoded feature image and the second decoded feature image, and provide the feature-aligned second decoded feature image as an input of the next element. In this case, the next element may be the next residual block included in the second decoder network 170, or may be the next element in the second decoder network 170 when the next residual block included in the second decoder network 170 is absent.

Specifically, the feature alignment units 181, 182, 183, and 184 may perform feature alignment on the first decoded feature image based on the first decoded feature image output from the residual block of each layer and the second decoded feature image output from the residual block of the corresponding layer in the second decoder network 170, merge the second decoded feature image with the feature-aligned first decoded feature image, and provide the fused second decoded feature image as an input of the next element of the corresponding layer in the second decoder network 170. An exemplary structure of the feature alignment unit 180 may be shown in FIG. 3.

In addition, the second decoder network 170 may further include SE blocks 191, 192, 193, and 194 after the feature alignment units 181, 182, 183, and 184 after each residual block. The SE blocks 191, 192, 193, and 194 may obtain a fused feature image by fusing the feature-aligned second decoded feature image output from the feature alignment units 181, 182, 183, and 184 and a second encoded feature image input into the residual block of the corresponding layer in the second encoder network 160, and provide the fused feature image as an input of the next element of the corresponding layer in the second decoder network 170. In this case, the next element may be the next residual block included in the second decoder network 170, or may be the next element in the second decoder network 170 when the next residual block included in the second decoder network 170 is absent.

As shown in FIG. 1, for example, the SE blocks 191, 192, 193, and 194 after the first residual block of the second decoder network 170 may fuse the feature-aligned second decoded feature image output from the feature alignment units 181, 182, 183, and 184 after the first residual block with the second encoded feature image input into the last residual block in the second encoder network 160. In this case, the second decoded feature image and the second encoded feature image may be the same in size. As another example, the SE blocks 191, 192, 193, and 194 after a second residual block of the second decoder network 170 may fuse the feature-alignment second decoded feature image output from the feature alignment units 181, 182, 183, and 184 after the second residual block with the second encoded feature image input into the third residual block in the second encoder network 160. In this case, the second decoded feature image and the second encoded feature image may be the same in size.

Figure 4:
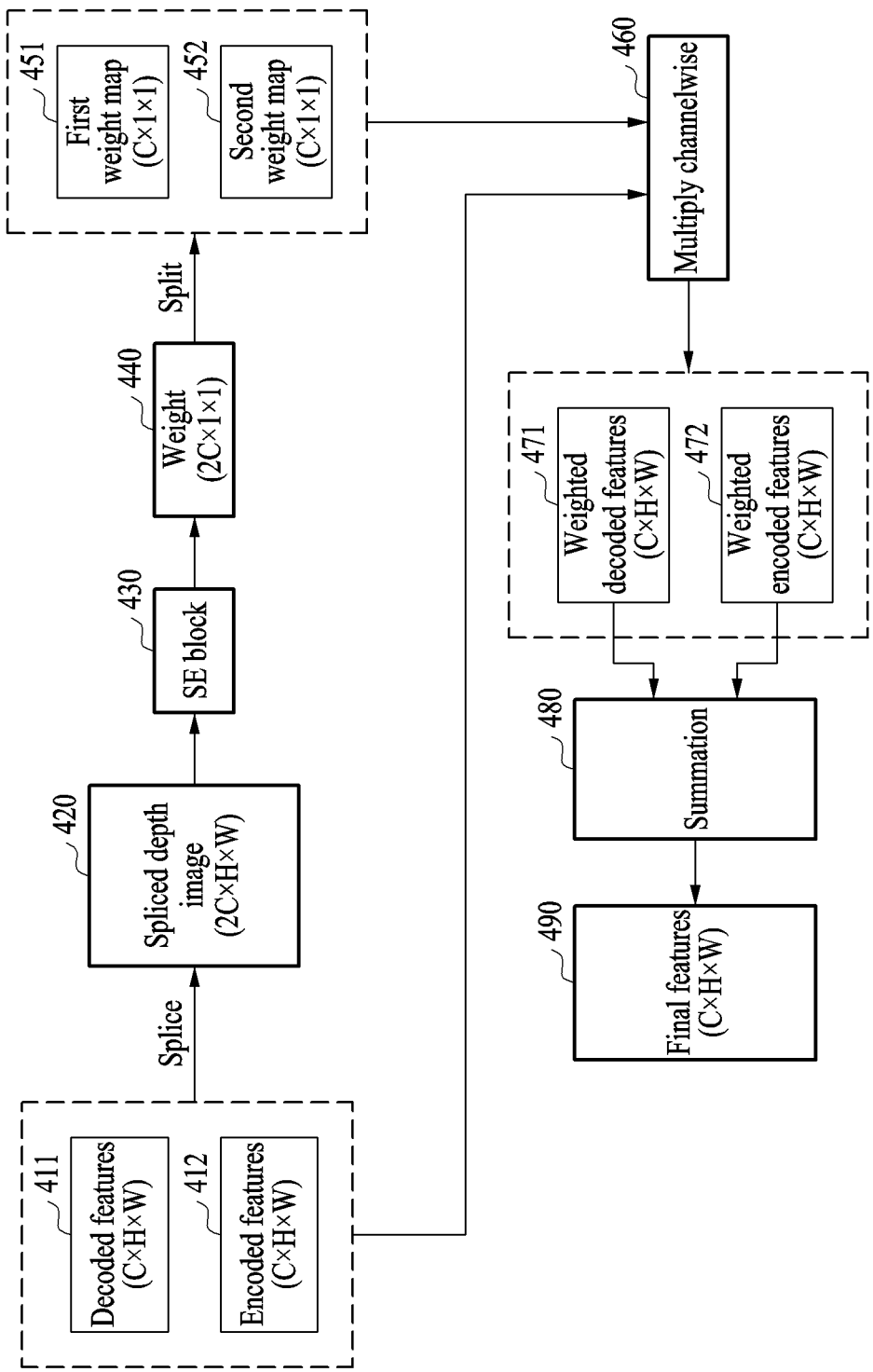
FIG. 4 illustrates an example of a squeeze-excitation (SE) block fusion method, according to one or more embodiments.

FIG. 4 illustrates an example of an SE block fusion method, according to one or more embodiments.

The core idea of the SE blocks 191, 192, 193, and 194 is that when it is necessary to compress, for example, C2 channel features into C1 channel features (C2 may be an integer multiple of C1), a feature weight of each channel is automatically learned through a network, a weight of an effective feature is enlarged, and a weight of an invalid or inefficient feature is reduced, so that the network may selectively use different features. In the second DNN 120, the SE blocks 191, 192, 193, and 194 may be used to learn the weights of different features and perform feature fusion with the learned weights.

As shown in FIG. 4, the SE block fusion method may first splice, for example, for the residual block of each layer in the second decoder network 170, a C-channel feature image (decoded features 411) output from the feature alignment unit 180 after the residual block and a C-channel feature image (encoded features 412) of the residual block of the corresponding layer input from the second decoder network 170 to obtain a single 2C-channel feature vector (a spliced depth image 420). Then, as the 2C-channel feature vector (the spliced depth image 420) is passed through an SE block 430, the SE block fusion method may generate a weight map 440 with a quantity of 2C. Then, the SE block fusion method may split the obtained weight map into two weight vectors (decoded feature weights (a first weight map 451) and encoded feature weights (a second weight map 452)) with C channels in the original order. In this case, each weight range may be from "0" to "1". Subsequently, the SE block fusion method may weight (e.g., apply the first weight map 451 and the second weight map 452 to) the original two C-channel feature images (the decoded features 411 and the encoded features 412) according to a channel multiplication method 460 that multiplies channel-wise, to generate the weighted two C-channel feature images (weighted decoded features 471 and weighted encoded features 472). Finally, the SE block fusion method may generate a final single C-channel feature image (a fused final feature image 490) through a channel addition method 480 through summation and provide the same to the next element in the second decoder network 170.

Referring back to FIG. 1, the first depth predictor 114 may synthesize the feature images output from the first decoder network 150 into a single depth image (e.g., referred to as the first depth image 119). The original color image 101 may undergo convolution processing by the first preprocessing unit 111, the first encoder network 140, the first dilated convolution unit 115, and the first decoder network 150, and may then be converted into a C-channel feature image. For example, C may be 32, 64, 128, etc. Therefore, the first depth predictor 114 may need to synthesize the C-channel feature image into a single-channel depth image. For example, the first depth predictor 114 may include two convolutional layers to synthesize the C-channel feature image into a single-channel depth image, wherein the first convolutional layer may reduce the feature channels to half of the original number thereof, that is, to C/2, and the second convolutional layer may compress the C/2-channel feature image into a single-channel depth image. In addition, the normalization layer (e.g., the batch normalization layer) and the activation layer (e.g., the PReLU layer) may also be included between the first convolutional layer and the second convolutional layer. The normalization layer may normalize the feature image output from the first convolutional layer so that the output features may have the same scale, and the activation layer may non-linearize the normalized feature image and output the same to the second convolutional layer.

Similarly, the second depth predictor 124 may synthesize the feature images output from the second decoder network 170 into a single depth image (e.g., referred to as the second depth image 129). The original depth image 102 may be converted into a C-channel feature image after passing through the second preprocessing unit 121, the second encoder network 160, the second dilated convolution unit 125, and the second decoder network 170. For example, C may be 32, 64, 128, etc. Therefore, the second depth predictor 124 may need to synthesize the C-channel feature image into a single-channel depth image. For example, the second depth predictor 124 may include two convolutional layers to synthesize the C-channel feature image into a single-channel depth image, wherein the first convolutional layer may reduce the feature channels to half of the original, that is, C/2, and the second convolutional layer may compress the C/2-channel feature image into a single-channel depth image. In addition, the normalization layer (e.g., the batch normalization layer) and the activation layer (e.g., the PReLU layer) may also be included between the first convolutional layer and the second convolutional layer. The normalization layer may normalize the feature image output from the first convolutional layer so that the output features may have the same scale, and the activation layer may non-linearize the normalized feature image and output the same to the second convolutional layer.

The fuser 130 may fuse the first depth image 119 output from the first DNN 110 and the second depth image 129 output from the second DNN 120 to obtain a finally completed depth image (that is, the final depth image 131).

In some embodiments, the fuser 130 may be implemented by an attention processing unit (an attention network). The fuser 130 may also be implemented in any feasible manner, and the disclosure does not limit the implementation manner of the fuser 130. In the following, the method of implementing the fuser 130 through the attention processing unit is described in detail.

The attention processing unit may generate two weight maps for two respective input depth images through a trainable network, multiply the weight maps back to an original depth image, and add the thus-weighted depth images to obtain a final depth image. The attention processing unit may monitor a spatial location. That is, the attention processing unit may output a corresponding weight for each pixel in the depth image. The output weight map may have exactly the same resolution as the depth image.

Figure 5:
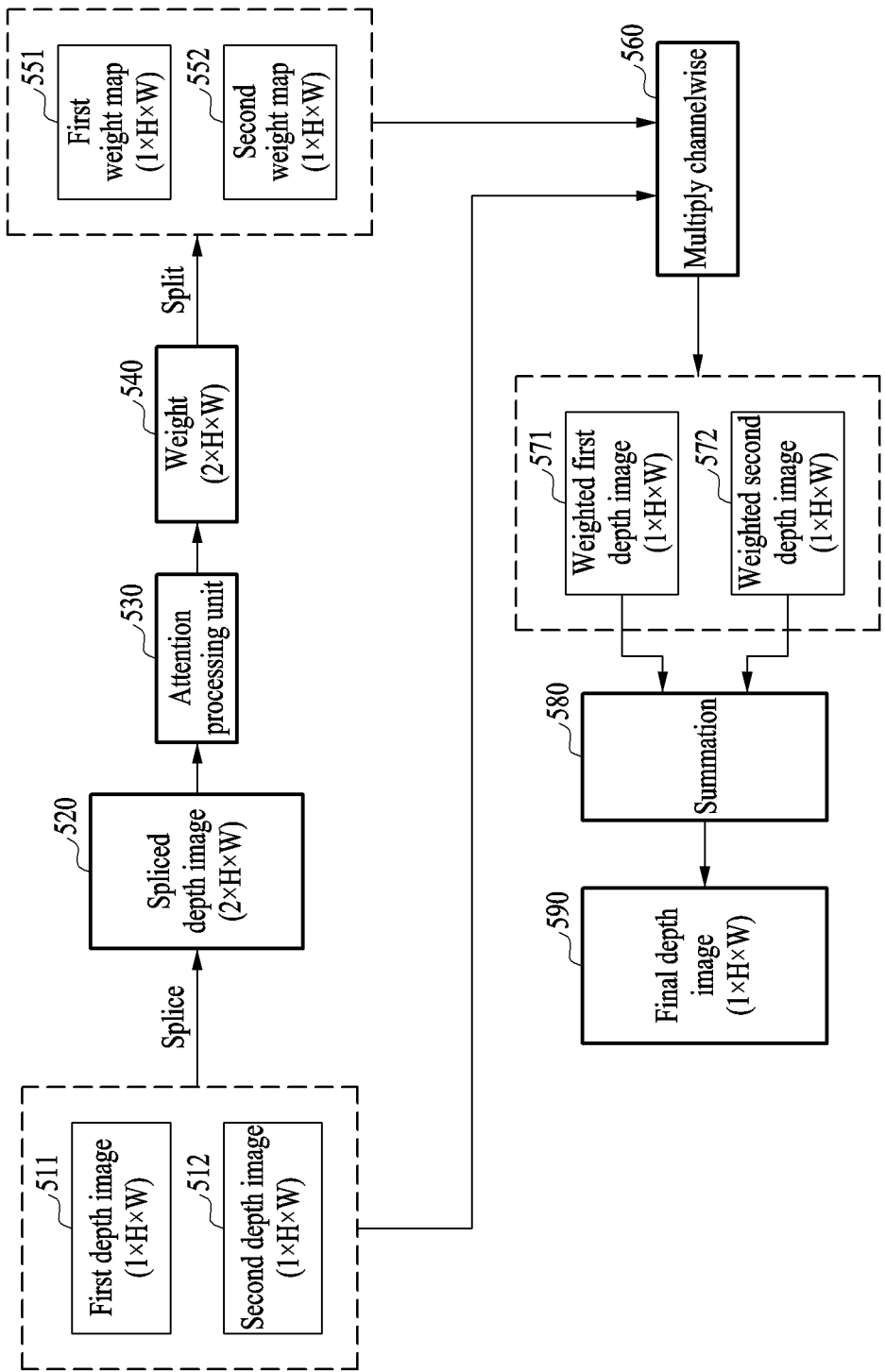
FIG. 5 illustrates an example of a fusion method based on an attention mechanism, according to one or more embodiments.

FIG. 5 illustrates an example of a fusion method based on an attention mechanism, according to one or more embodiments.

As shown in FIG. 5, the fusion method based on the attention mechanism may first receive a first depth image 511 (e.g., D1) and a second depth image 512 (e.g., D2), then splice the first depth image 511 and the second depth image 512, and input the spliced depth image 520 to an attention processing unit 530. The attention processing unit 530 may generate a weight of each pixel in the spliced depth image 520 to generate a corresponding weight map 540. The fusion method based on the attention mechanism may split the obtained weight map 540 into two weight maps (a first weight map 551 (e.g., W1) and a second weight map 552 (e.g., W2)) corresponding to the first depth image 511 and the second depth image 512 respectively in the original order. The fusion method based on the attention mechanism may multiply, in operation 560, the two weight maps 551 and 552 with the first depth image 511 and the second depth image 512 respectively by pixels to obtain a weighted first depth image 571 and a weighted second depth image 572. Then, the fusion method based on the attention mechanism may add the weighted first depth image 571 and the weighted second depth image 572 pixelwise using summation 580 to obtain a final depth image 590 (e.g., D). The process of FIG. 5 may be expressed by Equation 1 below.

$$D = D1 \odot W1 + D2 \odot W2 \qquad \text{Equation 1}$$

In Equation 1, D1 denotes the first depth image output from the first DNN 110, D2 denotes the second depth image output from the second DNN 120, W1 and W2 respectively denote the weights corresponding to the depth maps, and $\odot$ denotes multiplication by corresponding pixels.

Referring back to FIG. 1, in some implementations, the depth image completion model 100 may have one or more of the following advantages. (1) A novel combined depth image enhancement framework based on dual-domain information fusion is proposed. The framework is a general framework for guidance-based depth image enhancement and may expand to depth image enhancement tasks not only for color image guidance but also for IR image guidance. (2) A new multi-dimensional feature fusion method, channel-spatial feature fusion, which combines the features of the original color image 101 and the features of the original depth image 102, fully integrates and utilizes features of different image domains in two dimensions of channel and space, and enhances the guiding role of a color image in depth image completion algorithms. (3) Competitive results can be achieved on different datasets in multiple indoor and outdoor scenarios.

In the following, an example method of training the depth image completion model 100 is described in detail.

First, the method of training the depth image completion model 100 may involve preparing training samples. The training samples may include pairs of original color images and an original depth images. An original color image and an original depth image collected by a sensor may be projected onto the same coordinate system through image registration, so that pixels of the two images may have one-to-one correspondence. The training samples may be obtained through various datasets.

According to an example of the present disclosure, if the training samples are scarce, data expansion may be performed through some auto-generation or data augmentation operations, such as random horizontal flip, random vertical flip, color jitter, and the like. This may enable a network to learn more scenes and corresponding relationships in different environments, the robustness of a model may be well enhanced, and overfitting may be reduced.

According to an example of the present disclosure, for a hole-filling task, the training samples may include pairs of original color images and original depth images. Here, an original depth image may be a depth image with a hole. For a sparse depth densification task, the training samples may include multiple pairs of original color images and sparse depth images. Here, a sparse depth image may be obtained through a database including sparse depth images, or may be obtained by performing sparse sampling on a depth image ground truth or a dense depth image. For example, when an original depth image is a depth image with a hole, the original depth image may be filled to obtain a ground truth value of the depth image, and then, sparse sampling may be performed on the ground truth value of the depth image to obtain a sparse depth image. In addition, the depth image completion model 100 may be trained through training samples including multiple pairs of original color images and original depth images as well as multiple pairs of original color images and sparse depth images, so as to simultaneously satisfy the hole completion task and the sparse depth densification task.

Second, the method of training the depth image completion model 100 may construct a loss function. Model training may use an Adam optimizer under supervision of the loss function to continuously update parameters in the network through back propagation, so that the network may better fit the input data, and to reduce the difference between a predicted depth image and a real depth image.

According to an example of the present disclosure, in addition to using the mean squared error (MSE) of a pixel of the predicted depth image and a pixel of the real depth image as the loss function, introducing a structure loss obtained based on a structural similarity index measure (SSIM) of the pixel of the predicted depth image and the pixel of the real depth image as the loss function may improve the quality of a final depth image and may eliminate noise and any checkerboard effect in the network, so that the obtained final depth image may have rich details and high edge quality.

Figure 6:
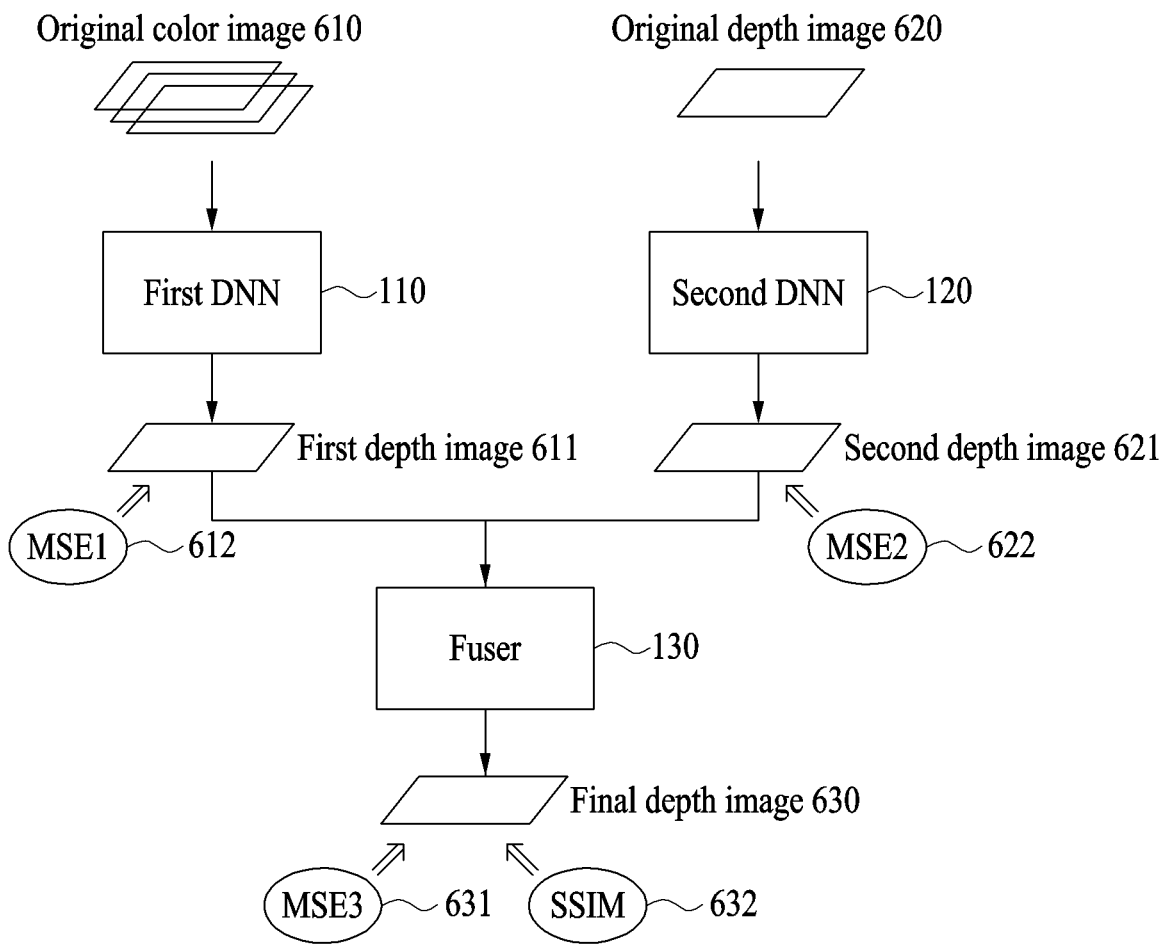
FIG. 6 illustrates an example of a loss function, according to one or more embodiments.

FIG. 6 illustrates an example of a loss function, according to one or more embodiments.

As shown in FIG. 6, in order for a depth restoration model to learn a mapping relationship between an original color image 610 and a first depth image 611, an MSE loss (MSE1) 612 may be used for monitoring by a depth predictor of a color branch. Similarly, in order to learn a relationship between an original depth image 620 and a completed second depth image 621, an MSE loss function (MSE2) 622 may be used by a depth predictor of a depth branch.

The fuser 130 configured to fuse a final depth may use an MSE and an SSIM as loss functions (MSE3 631 and SSIM 632) to monitor a final depth image 630.

The MSE loss function may be expressed by Equation 2 below.

$$MSE = \frac{1}{N}\sum_{i=0}^{N}(D-D^*)^2 \qquad \text{Equation 2}$$

In Equation 2, N denotes the number of effective pixels in the image, D denotes the predicted depth value, and D* denotes the real depth value.

The SSIM loss function may be expressed by Equation 3 below.

$$L_{SSIM}=1-SSIM(x,y) \qquad \text{Equation 3}$$

In Equation 3, SSIM denotes the structural similarity index measure, and x and y denote the predicted depth image and the real depth image, respectively. The SSIM may be expressed by Equation 4 below.

$$SSIM(x,y) = \frac{(2\mu_x\mu_y+c_1)(2\sigma_{xy}+c_2)}{(\mu_x^2+\mu_x^2+c_1)(\sigma_x^2+\sigma_y^2+c_2)} \qquad \text{Equation 4}$$

In Equation 4, $\mu_x$ denotes the mean value of pixel values of the image x. $\mu_y$ denotes the mean value of pixel values of the image y. $\sigma_x^2$ denotes the variance of the pixel values of the image x. $\sigma_y^2$ denotes the variance of the pixel values of the image y. $\sigma_{xy}$ denotes the covariance of the pixel values of the image x and the image y. $c_1$ and $c_2$ denote constants. The structural similarity may range from 0 to 1.

The loss function according to some embodiments may be expressed by Equation 5 below.

$$\text{Loss}=\vec{\lambda}\cdot\vec{l}=\lambda_1\cdot l_{out}+\lambda_2\cdot l_{ssim}+\lambda_3\cdot l_D+\lambda_4\cdot l_C \qquad \text{Equation 5}$$

In Equation 5, $\vec{\lambda}$ denotes a loss weight coefficient vector, representing the penalty effect of different loss functions in practice, for example, but is not limited thereto. $\vec{\lambda}=[0.5, 1.0, 0.25, 0.25]$. $\vec{l}$ denotes a loss vector including four losses (e.g., MSE3, SSIM, MSE2, and MSE1). $l_{out}$ denotes the MSE loss of the final depth image. $I_{ssim}$ denotes the structural loss of a final depth map. $l_D$ and $l_C$ denote the MSE loss of a depth prediction branch and the MSE loss of a depth estimation branch, respectively.

According to an example of the present disclosure, the loss function may be constructed differently according to properties of whichever dataset is used for training. For example, for a dataset including sparse images, it is meaningless to consider the SSIM, so the loss function may be expressed by Equation 6 below.

$$\text{Loss}=\vec{\lambda}\cdot\vec{l}=\lambda_1\cdot l_{out}+\lambda_2\cdot l_D+\lambda_3\cdot l_C \qquad \text{Equation 6}$$

In Equation 6, $\vec{\lambda}$ satisfies, for example, but is not limited to, $\vec{\lambda}=[1.0, 0.5, 0.5]$, and $\vec{l}$ denotes a loss vector including three losses (e.g., MSE3, MSE2, and MSE1).

Figure 7:
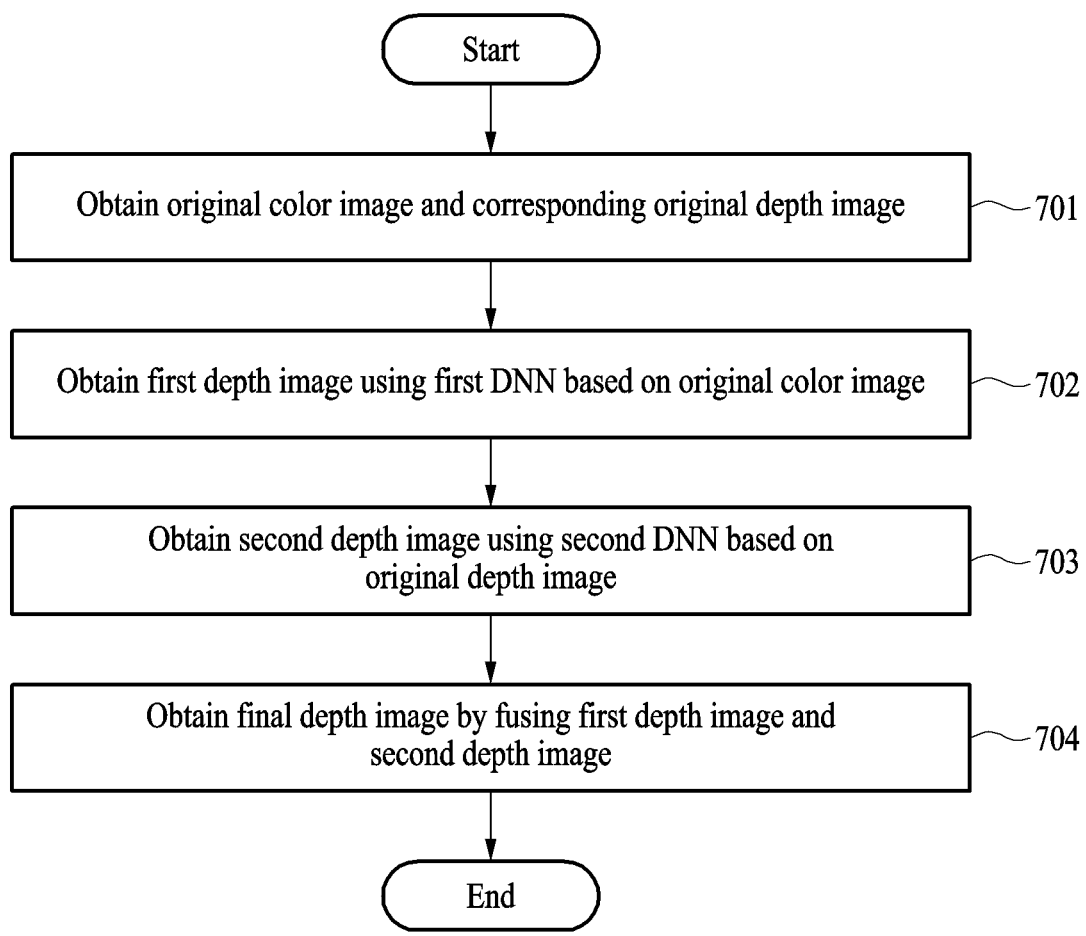
FIG. 7 illustrates an example of a depth image completion method, according to one or more embodiments.

FIG. 7 illustrates an example of a depth image completion method, according to one or more embodiments.

Referring to FIG. 7, in operation 701, a depth image completion method (hereinafter, referred to as "the method") may obtain an original color image 101 and a corresponding original depth image 102. Here, the original color image 101 and the original depth image 102 may be obtained by pairing and calibrating a color camera and a depth camera at the same position to capture the same scene at the same time and then registering the two images, or may be obtained from a local memory or a local database as necessary, or may be received from an external data source (e.g., the Internet, a server, a database, etc.) through an input device or a transmission medium. The original color image 101 and the original depth image 102 may be images corresponding to each other. For example, the original color image 101 and the original depth image 102 collected by a sensor may be projected onto the same coordinate system through image registration, so that pixels of the two images may have one-to-one correspondence. That is, any two corresponding (or closely corresponding) pixels in the two images may represent a same physical/scene feature of the scene represented in the two images.

In some embodiments, the method may obtain a depth image having a pixel value of 0 as the corresponding original depth image 102, in response to the corresponding original depth image 102 being absent.

In operation 702, the method may obtain a first depth image 119 using a first DNN 110 based on the original color image 101.

In operation 703, the method may obtain a second depth image 129 using a second DNN 120 based on the original depth image 102.

In operation 703, the method may perform feature alignment on a first decoded feature image output from the residual block of each layer in the first decoder network 150 and a second decoded feature image output from the residual block of a corresponding layer in the second decoder network 170 based on the first decoded feature image and the second decoded feature image, and provide the feature-aligned second decoded feature image as an input of the next element. For example, the method may obtain a first spliced feature image by splicing the first decoded feature image output from the residual block of each layer in the first decoder network 150 and the second decoded feature image output from the residual block of the corresponding layer in the second decoder network 170, obtain a pixel position offset of the first decoded feature image based on the first spliced feature image, obtain a corrected first decoded feature image by correcting a pixel position of the first decoded feature image based on the pixel position offset of the first decoded feature image, obtain a second spliced feature image by splicing the second decoded feature image and the corrected first decoded feature image, and obtain the feature-aligned second decoded feature image by processing convolution on the second spliced feature image.

According to an example of the present disclosure, in operations 702 and 703, the method may perform channel shuffling on a first encoded feature image output from the residual block of each layer in the first encoder network 140 and a second encoded feature image output from the residual block of each layer in the second encoder network 160, and provide the channel-shuffled first encoded feature image and the channel-shuffled second encoded feature image as an input of the next element in the first encoder network 140 and an input of the next element in the second encoder network 160, respectively. In this case, the method may exchange, through channel shuffle, channel feature images of a predetermined number of channels (e.g., half the number of channels) of the first encoded feature image output from the residual block of each layer in the first encoder network 140 with channel feature images of the predetermined number of channels of the second encoded feature image output from the residual block of each layer in the second encoder network 160.

According to an example of the present disclosure, the first DNN 110 and the second DNN 120 may further include a first dilated convolution unit 115 and a second dilated convolution unit 125 before the N-layer residual block of each of the first decoder network 150 and the second decoder network 170.

In operations 702 and 703, the method may input the first encoded feature image output from the last residual block of the first encoder network 140 into the first dilated convolution unit 115 positioned before the first decoder network 150, and input a first hole-feature image output from the first dilated convolution unit 115 into the first residual block of the first decoder network 150. The method may input the second encoded feature image output from the last residual block of the second encoder network 160 into the second dilated convolution unit 125 positioned before the second decoder network 170, and input a second hole-feature image output from the second dilated convolution unit 125 into the first residual block of the second decoder network 170.

In some embodiments, in operation 703, the method may perform feature alignment on the first hole-feature image and the second hole-feature image based on the first hole-feature image and the second hole-feature image, fuse the second hole-feature image and the feature-aligned first hole-feature image, and input the feature-aligned second hole-feature image into the first residual block of the second decoder network 170. For example, the method may obtain a third spliced feature image by splicing the first hole-feature image and the second hole-feature image, obtain a pixel position offset of the first hole-feature image based on the third spliced feature image, obtain a corrected first hole-feature image by correcting a pixel position of the first hole-feature image based on the pixel position offset of the first hole-feature image, obtain a fourth spliced feature image by splicing the second hole-feature image and the corrected first hole-feature image, and obtain the feature-aligned second hole-feature image by processing convolution on the fourth spliced feature image.

In some embodiments, the second DNN 120 may further include SE blocks 191, 192, 193, and 194. In operation 703, a fused feature image may be obtained by fusing, through the SE blocks 191, 192, 193, and 194, the feature-aligned second decoded feature image and the second encoded feature image input into the residual block of a corresponding layer in the second encoder network, and provide the fused feature image as an input of the next element of the corresponding layer in the second decoder network 170.

In some embodiments, the first DNN 110 may further include a first preprocessing unit 111 and a first depth predictor 114, and the second DNN 120 may further include a second preprocessing unit 121 and a second depth predictor 124.

In operations 702 and 703, a color feature image may be obtained by inputting the original color image 101 into the first preprocessing unit 111, obtaining a depth feature image by inputting the original depth image 102 into the second preprocessing unit 121, performing channel shuffle on the color feature image and the depth feature image, providing the channel-shuffled color feature image and the channel-shuffled depth feature image as inputs of the first encoder network 140 and the second encoder network 160, respectively. For example, channel feature images of a predetermined number of channels (e.g., half the number of channels) of the color feature image may be exchanged with channel feature images of the predetermined number of channels of the depth feature image.

In operations 702 and 703, the first depth image 119 may be obtained by inputting a first decoded feature image output from the first decoder network 150 into the first depth predictor 114, and the second depth image 129 may be obtained by inputting a second decoded feature image output from the second decoder network 170 into the second depth predictor 124.

In operation 704, a final depth image 131 may be obtained by fusing the first depth image 119 and the second depth image 129. Here, operation 704 may be performed by the fuser 130 in the depth image completion model 100 described above.

In some embodiments, the fuser 130 may be implemented through an attention processing unit (e.g., an attention network). In this case, a first pixel weight map of the first depth image 119 and a second pixel weight map of the second depth image 129 may be obtained using the attention processing unit, and the final depth image 131 may be obtained by weighting and summing the first depth image 119 and the second depth image 129 based on the first pixel weight map and the second pixel weight map.

In some embodiments, the residual blocks in the second encoder network 160 and the second decoder network 170 may be implemented using gated convolution.

In some embodiments, the depth image completion model 100 may be obtained by training the depth image completion model 100 using a loss function. In this case, the loss function may be obtained based on a first mean squared error loss (MSE1) between the first depth image and a real depth image (any ground truth depth image), a second mean squared error loss (MES2) between the second depth image and the real depth image, and a third mean squared error loss (MSE3) between the final depth image and the real depth image. For example, the loss function may be obtained based on the first mean squared error loss, the second mean squared error loss, and the third mean squared error loss.

In some embodiments, the loss function may be generated in consideration of the first mean squared error loss (MSE1), the second mean squared error loss (MSE2), the third mean squared error loss (MSE3), and a structural loss (SSIM) between the final depth image and the real depth image. In this case, Structure Loss=1−SSIM may be satisfied. For example, the loss function may be obtained by weighted summation of the first mean squared error loss, the second mean squared error loss, the third mean squared error loss, and the structure loss.

Figure 8:
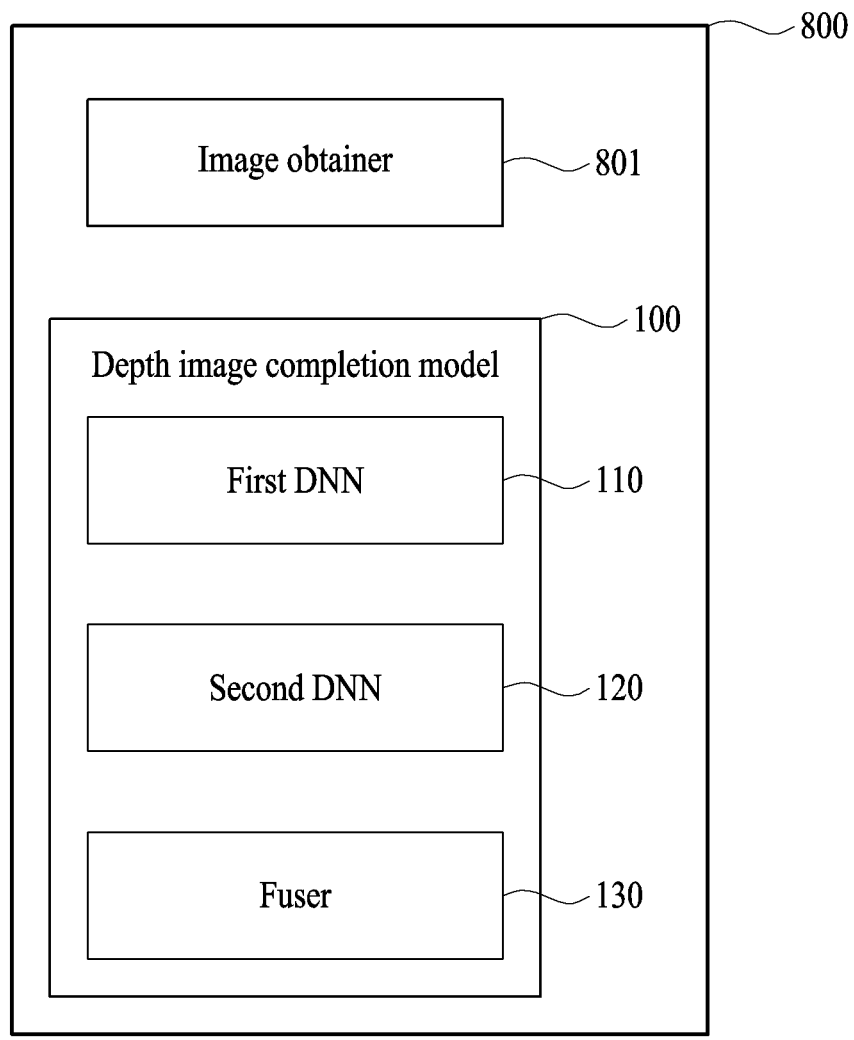
FIG. 8 illustrates an example of a configuration of a depth image completion device, according to one or more embodiments.

FIG. 8 illustrates an example of a configuration of a depth image completion device, according to one or more embodiments.

Referring to FIG. 8, a device 800 for depth image completion may include an image obtainer 801 and a depth image completion model 100. The depth image completion model 100 may include a first DNN 110, a second DNN 120, and a fuser 130.

The image obtainer 801 may obtain an original color image 101 and a corresponding original depth image 102. Here, the original color image 101 and the original depth image 102 may be obtained by pairing and calibrating a color camera and a depth camera at the same position to capture the same scene at the same time and then registering the two images obtained, or may be obtained from a local memory or a local database as necessary, or may be received from an external data source (e.g., the Internet, a server, a database, etc.) through an input device or a transmission medium. In some embodiments, a camera may include both a color and depth sensor to provide the respective images. The original color image 101 and the original depth image 102 may be images corresponding to each other, i.e., images of a same scene and taken close enough in time to permit mutual restoration. For example, the original color image 101 and the original depth image 102 collected by a sensor may be projected onto the same coordinate system through image registration, so that pixels of the two images may have one-to-one correspondence.

In some embodiments, the image obtainer 801 may obtain a depth image having pixel values of all 0 as the corresponding original depth image 102, in response to the corresponding original depth image 102 being absent. That is to say, due to timing issues or anomalies, for example, occasionally there might not be a depth image accompanying a color image. In this case, an empty or null depth image (e.g., all pixels are 0) may be used and reasonable results may still be obtained.

The first DNN 110 may obtain a first depth image 119 based on the original color image 101. The second DNN 120 may obtain a second depth image 129 based on the original depth image 102. The second DNN 120 may perform feature alignment on a first decoded feature image output from the residual block of each layer in the first decoder network 150 and a second decoded feature image output from the residual block of a corresponding layer in the second decoder network 170 based on the first decoded feature image and the second decoded feature image, and provide the feature-aligned second decoded feature image as an input of the next element in the second decoder network 170. For example, the second decoder network 170 may obtain a first spliced feature image by splicing the first decoded feature image output from the residual block of each layer in the first decoder network 150 and the second decoded feature image output from the residual block of the corresponding layer in the second decoder network 170, obtain a pixel position offset of the first decoded feature image based on the first spliced feature image, obtain a corrected first decoded feature image by correcting a pixel position of the first decoded feature image based on the pixel position offset of the first decoded feature image, obtain a second spliced feature image by splicing the second decoded feature image and the corrected first decoded feature image, and obtain the feature-aligned second decoded feature image by processing convolution on the second spliced feature image.

In some embodiments, the first DNN 110 and the second DNN 120 may perform channel shuffling on a first encoded feature image output from the residual block of each layer in the first encoder network 140 and a second encoded feature image output from the residual block of each layer in the second encoder network 160, and provide the channel-shuffled first encoded feature image and the channel-shuffled second encoded feature image as an input of the next element of the corresponding layer in the first encoder network 140 and an input of the next element in the second encoder network 160, respectively. For example, the first DNN 110 and the second DNN 120 may exchange channel feature images of a predetermined number of channels (e.g., half the number of channels) of the first encoded feature image output from the residual block of each layer in the first encoder network 140 with channel feature images of the predetermined number of channels of the second encoded feature image output from the residual block of each layer in the second encoder network 160.

In some embodiments, the first DNN 110 and the second DNN 120 may further include a first dilated convolution unit 115 and a second dilated convolution unit 125 before the N-layer residual block included in each of the first decoder network 150 and the second decoder network 170.

The first DNN 110 may input the first encoded feature image output from the last residual block of the first encoder network 140 into the first dilated convolution unit 115, and input a first hole-feature image output from the first dilated convolution unit 115 into the first residual block of the first decoder network 150. The second DNN 120 may input the second encoded feature image output from the last residual block of the second encoder network 160 into the second dilated convolution unit 125, and input a second hole-feature image output from the second dilated convolution unit 125 into the first residual block of the second decoder network 170.

In some embodiments, the second DNN 120 may perform feature alignment on the first hole-feature image and the second hole-feature image based on the first hole-feature image and the second hole-feature image, fuse the second hole-feature image and the feature-aligned first hole-feature image, and input the feature-aligned second hole-feature image into the first residual block of the second decoder network 170. For example, the second decoder network 170 may also obtain a third spliced feature image by splicing the first hole-feature image and the second hole-feature image, obtain a pixel position offset of the first hole-feature image based on the third spliced feature image, obtain a corrected first hole-feature image by correcting a pixel position of the first hole-feature image based on the pixel position offset of the first hole-feature image, obtain a fourth spliced feature image by splicing the second hole-feature image and the corrected first hole-feature image, and obtain the feature-aligned second hole-feature image by processing convolution on the fourth spliced feature image.

In some embodiments, the second DNN 120 may further include SE blocks 191, 192, 193, and 194. The second DNN 120 may obtain a fused feature image by fusing, through the SE blocks 191, 192, 193, and 194, the feature-aligned second decoded feature image and the second encoded feature image input into the residual block of a corresponding layer in the second encoder network, and provide the fused feature image as an input of the next element in the second decoder network 170.

In some embodiments, the first DNN 110 may further include a first preprocessing unit 111 and a first depth predictor 114, and the second DNN 120 may further include a second preprocessing unit 121 and a second depth predictor 124.

The first preprocessing unit 111 may obtain a color feature image by processing the original color image 101. The second preprocessing unit 121 may obtain a depth feature image by processing the original depth image 102. The depth image completion model 100 may further include a channel shuffle unit (not shown), wherein the channel shuffle unit may be configured to perform channel shuffle on the color feature image and the depth feature image and provide the channel-shuffled color feature image and the channel-shuffled depth feature image as inputs of the first encoder network and the second encoder network, respectively. Further, the first depth predictor 114 may obtain the first depth image 119 by processing the first decoded feature image output from the first decoder network 150, and the second depth predictor 124 may obtain the second depth image 129 by processing the second decoded feature image output from the second decoder network 170. The fuser 130 may obtain a final depth image 131 by fusing the first depth image 119 and the second depth image 129.

In some embodiments, the fuser 130 may be implemented through an attention processing unit (e.g., an attention network). In this case, the fuser 130 may obtain a first pixel weight map of the first depth image 119 and a second pixel weight map of the second depth image 129 using the attention processing unit, and obtain the final depth image 131 by weighting and summing the first depth image 119 and the second depth image 129 based on the first pixel weight map and the second pixel weight map.

In some embodiments, the residual blocks in the second encoder network 160 and the second decoder network 170 may be implemented using gated convolution.

In some embodiments, the depth image completion model 100 may be obtained by training the depth image completion model using a loss function. The loss function may be obtained based on a first mean squared error loss (MSE1) between the first depth image and a real depth image, a second mean squared error loss (MES2) between the second depth image and the real depth image, and a third mean squared error loss (MSE3) between the final depth image and the real depth image. For example, the loss function may be obtained based on the first mean squared error loss, the second mean squared error loss, and the third mean squared error loss.

In some embodiments, the loss function may be generated in consideration of the first mean squared error loss (MSE1), the second mean squared error loss (MSE2), the third mean squared error loss (MSE3), and a structural loss (SSIM) between the final depth image and the real depth image. In this case, Structure Loss=1−SSIM may be satisfied. For example, the loss function may be obtained by weighted summation of the first mean squared error loss, the second mean squared error loss, the third mean squared error loss, and the structure loss.

In some embodiments, there is provided a computing device including a processor and a memory. Here, the memory may store a computer program, and when the computer program is executed by the processor, the method for depth image completion In some embodiments may be realized.

In some embodiments, depth estimation on an original color image and an original depth image may be performed respectively through a color branch network and a depth branch network, and then depth estimation results of the two branches may be fused. In this process, color information and depth information may be fully fused in a feature domain and an image domain, respectively, and RGB information and the depth information may be fully fused to improve the quality of depth image completion. Specifically, the fusion of feature domains may be divided into two dimensions: channel and space. First, in the spatial dimension, a feature alignment unit aligns color features with depth features, generates an offset of the corresponding color features based on the depth features, calibrates the color features in a deformable convolution using the generated offset, and alleviates the mismatch of key point information caused by feature deformation or offset during the fusion process, thereby enhancing the multi-modal fusion ability of a network. In addition, in the channel dimension, channels of color features and depth features are scrambled and reorganized first through channel shuffle, so that the two features may be fully exchanged, effectively promoting the fusion of multi-modal information. In addition, the fusion of an image domain may also use an attention mechanism to fuse the two depth images output from the color branch network and the depth branch network, which enhances the fusion effect of the depth image and improves the model performance.

In addition, in the space dimension, a receptive field of the network may be expanded through dilated convolution, so that the network may capture more distant information, thereby enhancing the judgment ability of the network.

In addition, in the channel dimension, SE blocks may be used to perform channel fusion on an image channel by means of an attention mechanism, so that the network may adaptively learn the weights of two modal features, thereby better fusing the two features.

In addition, to enable the network to distinguish between effective pixels and invalid pixels in an image so that the generated depth image may well retain the original depth information, the depth branch network may use gated convolution to transmit mask information. Here, a gate operation in gated convolution may effectively identify the positions of the effective pixels and the invalid pixels, and the weight of the effective pixels may be higher than that of the invalid pixels.

In addition, in order to make the finally generated depth image rich in detail information and high in edge quality, training the depth image completion model of the present disclosure may be supplemented by structural similarity (SSIM)-related structural loss monitoring.

In addition, a depth image completion model may be trained end-to-end, avoiding the use of intermediate features, and effectively avoiding the risk of poor quality of intermediate features. In addition, a depth image completion model of the present disclosure may avoid the strategy of dynamically adjusting a convolution kernel and a filter kernel, and have an obviously faster running speed than a method of dynamically guiding a filter class. In addition, a depth image completion method may effectively improve the imaging quality of 3D sensors such as LiDAR and time of flight (ToF), so that devices (e.g., self-driving cars, mobile phones, etc.) equipped with such 3D sensors may better perform 3D modeling and detection. This method may achieve good results on both depth hole-filling and sparse depth densification tasks.

The computing apparatuses, the vehicles, the electronic devices, the processors, the memories, the image sensors, the vehicle/operation function hardware, the displays, the information output system and hardware, the storage devices, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method for depth image completion using a depth image completion model comprising a first neural network (NN) and a second NN, the method comprising:
    obtaining a first depth image using the first NN based on an original color image corresponding to an original depth image;
    obtaining a second depth image using the second NN based on the original depth image; and
    generating a final depth image by fusing the first depth image and the second depth image,
    wherein the first NN comprises a first encoder network comprising cascaded first N-layer residual blocks, and a first decoder network comprising cascaded second N-layer residual blocks, and wherein the second NN comprises a second encoder network comprising cascaded third N-layer residual block, and a second decoder network comprising cascaded fourth N-layer residual blocks, wherein
    the depth image completion model further comprises an attention processing unit, and
    wherein the generating of the final depth image by fusing the first depth image and the second depth image comprises:
        obtaining a first pixel weight map of the first depth image and a second pixel weight map of the second depth image using the attention processing unit; and
        obtaining the final depth image by weighting and summing the first depth image and the second depth image based on the first pixel weight map and the second pixel weight map.

2. The method of claim 1, wherein the obtaining of the first depth image and the obtaining of the second depth image comprises:
    performing channel shuffling on a first encoded feature image output from each of the first N-layer residual blocks and a second encoded feature image output from each of the third N-layer residual blocks respectively corresponding to the first N-layer residual blocks;
    providing the channel-shuffled first encoded feature image to a next first N-layer residual block, or outputting the channel-shuffled first encoded feature image to the first encoder network in response to the next first N-layer residual block being absent; and
    providing the channel-shuffled second encoded feature image to a next third N-layer residual block, or outputting the channel-shuffled second encoded feature image to the second encoder network in response to the next third N-layer residual block being absent.

3. The method of claim 1, wherein the channel shuffling exchanges channel feature images of a predetermined number of channels of the first encoded feature image output from each of the first N-layer residual blocks with channel feature images of the predetermined number of channels of the second encoded feature image output from each of the third N-layer residual blocks respectively corresponding to the first N-layer residual blocks.

4. The method of claim 1, wherein the first NN further comprises:
    a first dilated convolution unit before the second N-layer residual blocks, wherein the second NN further comprises:
        a second dilated convolution unit before the fourth N-layer residual blocks, and
    wherein the obtaining of the first depth image and the obtaining of the second depth image comprises:
        inputting a first hole-feature image output from the first dilated convolution unit into a first residual block of the second N-layer residual blocks of the first decoder network, in response to a first encoded feature image output from a last residual block of the first N-layer residual blocks of the first encoder network being input into the first dilated convolution unit; and
        inputting a second hole-feature image output from the second dilated convolution unit into a first residual block of the fourth N-layer residual blocks of the second decoder network, in response to a second encoded feature image output from a last residual block of the third N-layer residual blocks of the second encoder network being input into the second dilated convolution unit.

5. The method of claim 4, wherein the inputting of the second hole-feature image output from the second dilated convolution unit into the first residual block of the fourth N-layer residual blocks of the second decoder network comprises:
    before inputting the second hole-feature image output from the second dilated convolution unit into the first residual block of the fourth N-layer residual blocks of the second decoder network,
    performing feature alignment on the first hole-feature image and the second hole-feature image based on the first hole-feature image and the second hole-feature image; and
    inputting the feature-aligned second hole-feature image into the first residual block of the fourth N-layer residual blocks of the second decoder network.

6. The method of claim 5, wherein the performing of the feature alignment on the first hole-feature image and the second hole-feature image comprises:
    obtaining a third spliced feature image by splicing the first hole-feature image and the second hole-feature image;
    obtaining a pixel position offset of the first hole-feature image based on the third spliced feature image;
    obtaining a corrected first hole-feature image by correcting a pixel position of the first hole-feature image based on the pixel position offset of the first hole-feature image;
    obtaining a fourth spliced feature image by splicing the second hole-feature image and the corrected first hole-feature image; and
    obtaining the feature-aligned second hole-feature image by processing convolution on the fourth spliced feature image.

7. The method of claim 1, wherein the obtaining of the second depth image comprises:
    performing, based on a first decoded feature image output from each of the second N-layer residual blocks and a second decoded feature image output from each of the fourth N-layer residual blocks respectively corresponding to the second N-layer residual blocks, feature alignment on the first decoded feature image and the second decoded feature image; and providing the feature-aligned second decoded feature image to a next fourth N-layer residual block, or outputting the feature-aligned second decoded feature image to the second decoder network in response to the next fourth N-layer residual block being absent.

8. The method of claim 7, wherein the performing of the feature alignment on the first decoded feature image and the second decoded feature image comprises:

obtaining a first spliced feature image by splicing the first decoded feature image output from each of the second N-layer residual blocks and the second decoded feature image output from each of the fourth N-layer residual blocks respectively corresponding to the second N-layer residual blocks;

obtaining a pixel position offset of the first decoded feature image based on the first spliced feature image;

obtaining a corrected first decoded feature image by correcting a pixel position of the first decoded feature image based on the pixel position offset of the first decoded feature image;

obtaining a second spliced feature image by splicing the second decoded feature image and the corrected first decoded feature image; and obtaining the feature-aligned second decoded feature image by processing convolution on the second spliced feature image.

9. The method of claim 7, wherein the second NN further comprises a squeeze-excitation (SE) block, and wherein the providing of the feature-aligned second decoded feature image to the next fourth N-layer residual block, or outputting of the feature-aligned second decoded feature image to the second decoder network in response to the next fourth N-layer residual block being absent comprises:

before providing the feature-aligned second decoded feature image to a next fourth N-layer residual block, or outputting the feature-aligned second decoded feature image to the second decoder network in response to the next fourth N-layer residual block being absent, obtaining a fused feature image by fusing, through the SE block, the feature-aligned second decoded feature image and the second encoded feature image input from each of the third N-layer residual blocks corresponding to the fourth N-layer residual blocks; and providing the fused feature image to a next fourth N-layer residual block, or outputting the fused feature image to the second decoder network in response to the next fourth N-layer residual block being absent.

10. The method of claim 1, wherein the first NN further comprises a first preprocessing unit, wherein the second NN further comprises a second preprocessing unit, and wherein the obtaining of the first depth image and the obtaining of the second depth image comprises:

obtaining a color feature image by inputting the original color image into the first preprocessing unit;

obtaining a depth feature image by inputting the original depth image into the second preprocessing unit; and performing channel shuffle on the color feature image and the depth feature image, inputting the channel-shuffled color feature image into the first encoder network, and inputting the channel-shuffled depth feature image into the second encoder network.

11. The method of claim 1, wherein the first NN further comprises a first depth predictor, wherein the second NN further comprises a second depth predictor, wherein the obtaining of the first depth image comprises obtaining the first depth image by inputting a first decoded feature image output from the first decoder network into the first depth predictor, and wherein the obtaining of the second depth image comprises obtaining the second depth image by inputting a second decoded feature image output from the second decoder network into the second depth predictor.

12. The method of claim 1, wherein the third N-layer residual blocks of the second encoder network and the fourth N-layer residual blocks of the second decoder network are implemented using gated convolution.

13. The method of claim 1, further comprising:

obtaining the depth image completion model by training the depth image completion model using a loss function, wherein the loss function is obtained based on a first mean squared error loss between the first depth image and a real depth image, a second mean squared error loss between the second depth image and the real depth image, and a third mean squared error loss between the final depth image and the real depth image, or is obtained based on the first mean squared error loss, the second mean squared error loss, the third mean squared error loss, and a structural loss between the final depth image and the real depth image, and the structural loss is a value obtained by subtracting a structural similarity from 1.

14. The method of claim 1, wherein the obtaining of the original color image and the original depth image corresponding to the original color image comprises obtaining a depth image having a pixel value of "0" as the original depth image corresponding to the original color image, in response to the corresponding original depth image being absent.

15. A device for depth image completion using a depth image completion model comprising a first neural network (NN) and a second NN, the device comprising:

the first NN configured to obtain a first depth image based on an original color image corresponding to an original depth image;

the second NN configured to obtain a second depth image based on the original depth image;

a fuser configured to generate a final depth image by fusing the first depth image and the second depth image;

the first NN comprising a first encoder network comprising cascaded first N-layer residual blocks, and a first decoder network comprising cascaded second N-layer residual blocks; and the second NN comprising a second encoder network comprising cascaded third N-layer residual block, and a second decoder network comprising cascaded fourth N-layer residual blocks, wherein the fuser further comprises an attention processing unit, and is configured to obtain a first pixel weight map of the first depth image and a second pixel weight map of the second depth image using the attention processing unit, and obtain the final depth image by weighting and summing the first depth image and the second depth image based on the first pixel weight map and the second pixel weight map.

16. The device of claim 15, wherein the first NN and the second NN are further configured to:
perform channel shuffling on a first encoded feature image output from each of the first N-layer residual blocks and a second encoded feature image output from each of the third N-layer residual blocks respectively corresponding to the first N-layer residual blocks;
provide the channel-shuffled first encoded feature image to a next first N-layer residual block, or output the channel-shuffled first encoded feature image to the first encoder network in response to the next first N-layer residual block being absent; and
provide the channel-shuffled second encoded feature image to a next third N-layer residual block, or output the channel-shuffled second encoded feature image to the second encoder network in response to the next third N-layer residual block being absent.

17. The device of claim 15, wherein the first NN further comprises a first dilated convolution unit before the second N-layer residual blocks,
wherein the first dilated convolution unit is configured to input a first hole-feature image into a first residual block of the second N-layer residual blocks of the first decoder network, in response to a first encoded feature image output from a last residual block of the first N-layer residual blocks of the first encoder network being input thereinto,
wherein the second NN further comprises a second dilated convolution unit and a feature alignment unit before the fourth N-layer residual blocks,
wherein the second dilated convolution unit is configured to output a second hole-feature image in response to a second encoded feature image output from a last residual block of the third N-layer residual blocks of the second encoder network being input thereinto, and
wherein the feature alignment unit is configured to perform feature alignment on the first hole-feature image and the second hole-feature image based on the first hole-feature image and the second hole-feature image, and input the feature-aligned second hole-feature image into the first residual block of the fourth N-layer residual blocks of the second decoder network.

18. The device of claim 16, wherein the second decoder network further comprises:
a feature alignment unit configured to perform, based on a first decoded feature image output from each of the second N-layer residual blocks and a second decoded feature image output from each of the fourth N-layer residual blocks respectively corresponding to the second N-layer residual blocks, feature alignment on the first decoded feature image and the second decoded feature image; and
a squeeze-excitation (SE) block configured to obtain a fused feature image by fusing, through the SE block, the feature-aligned second decoded feature image and the second encoded feature image input from each of the third N-layer residual blocks corresponding to the fourth N-layer residual blocks, and provide the fused feature image to a next fourth N-layer residual block, or output the fused feature image to the second decoder network in response to the next fourth N-layer residual block being absent.

* * * * *